United States Patent
Zhu et al.

(10) Patent No.: US 12,245,068 B2
(45) Date of Patent: Mar. 4, 2025

(54) COMMUNICATION METHOD AND APPARATUS FOR SENDING CONTROL PLANE MESSAGES IN A TARGET CHANNEL

(71) Applicant: HUAWEI TECHNOLOGIES CO., LTD., Shenzhen (CN)

(72) Inventors: Haoren Zhu, Shanghai (CN); Huan Li, Shenzhen (CN); Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 17/849,122

(22) Filed: Jun. 24, 2022

(65) Prior Publication Data

US 2022/0330079 A1 Oct. 13, 2022

Related U.S. Application Data

(63) Continuation of application No. PCT/CN2019/128469, filed on Dec. 25, 2019.

(51) Int. Cl.
*H04W 28/02* (2009.01)
*H04W 28/06* (2009.01)
(Continued)

(52) U.S. Cl.
CPC ....... *H04W 28/0252* (2013.01); *H04W 28/06* (2013.01); *H04W 72/20* (2023.01); *H04W 80/04* (2013.01)

(58) Field of Classification Search
CPC . H04W 28/0252; H04W 28/06; H04W 72/20; H04W 80/04; H04W 76/12;
(Continued)

(56) References Cited

U.S. PATENT DOCUMENTS

| 5,886,989 A | 3/1999 | Evans et al. |
| 2005/0254653 A1 | 11/2005 | Potashnik et al. |

(Continued)

FOREIGN PATENT DOCUMENTS

| CN | 101640621 A | 2/2010 |
| CN | 101977446 A | 2/2011 |

(Continued)

OTHER PUBLICATIONS

J. Iyengar et al., QUIC: A UDP-Based Multiplexed and Secure Transport. draft-ietf-quic-transport-19, Mar. 11, 2019, 159 pages.
(Continued)

*Primary Examiner* — Afshawn M Towfighi
(74) *Attorney, Agent, or Firm* — HAUPTMAN HAM, LLP

(57) ABSTRACT

This application discloses a communication method and apparatus, to improve transmission efficiency of a control plane message of a terminal according to a control and provisioning of wireless access points protocol. In this application, a control request message of a terminal may be transmitted between a first communication apparatus and a second communication apparatus through a target channel. Because the target channel supports concurrency of a plurality of messages, transmission efficiency of the control request message of the terminal can be improved.

20 Claims, 10 Drawing Sheets

(51) Int. Cl.
*H04W 72/20* (2023.01)
*H04W 80/04* (2009.01)

(58) Field of Classification Search
CPC ..... H04W 88/08; H04W 88/12; H04W 92/12; H04W 84/12; H04L 65/1016; H04L 65/1036; H04L 65/1069; H04L 12/12
See application file for complete search history.

(56) References Cited

U.S. PATENT DOCUMENTS

| | | | |
|---|---|---|---|
| 2013/0329557 A1* | 12/2013 | Petry | H04L 63/0272 370/235 |
| 2014/0105060 A1* | 4/2014 | Baillargeon | H04W 8/24 370/253 |
| 2017/0078344 A1 | 3/2017 | Lai et al. | |
| 2018/0219788 A1* | 8/2018 | Wackerly | H04L 47/122 |
| 2020/0344717 A1* | 10/2020 | Grayson | H04W 68/005 |

FOREIGN PATENT DOCUMENTS

| | | |
|---|---|---|
| CN | 102811451 A | 12/2012 |
| CN | 102893547 A | 1/2013 |
| CN | 103338524 A | 10/2013 |
| CN | 104698856 A | 6/2015 |
| CN | 105210328 A | 12/2015 |
| CN | 107566235 A | 1/2018 |
| CN | 107770034 A | 3/2018 |
| CN | 110166273 A | 8/2019 |
| EP | 2341675 A1 | 7/2011 |
| JP | 2015022387 A | 2/2015 |
| WO | 2012072050 A1 | 6/2012 |
| WO | 2015003565 A1 | 1/2015 |
| WO | 2016192572 A1 | 12/2016 |
| WO | 2017137098 A1 | 8/2017 |

OTHER PUBLICATIONS

P. Calhoun et al., Control And Provisioning of Wireless Access Points (CAPWAP) Protocol Specification. RFC5415, Mar. 2009, 155 pages.

P. Calhoun et al., Control and Provisioning of Wireless Access Points (CAPWAP) Protocol Binding for IEEE 802.11. RFC5416, Mar. 2009, 76 pages.

3GPP TS 33.501 V16.0.0 (Sep. 2019), 3rd Generation Partnership Project; Technical Specification Group Services and System Aspects; Security architecture and procedures for 5G system(Release 16), 196 pages.

International Search Report issued in corresponding International Application No. PCT/CN2019/128469, dated Sep. 17, 2020, pp. 1-9.

Extended European Search Report issued in corresponding European Application No. 19957859.2, dated Nov. 4, 2022, pp. 1-7.

Chinese Office Action issued in corresponding Chinese Application No. 201980103296.0, mailed Nov. 18, 2022, pp. 1-9.

Xiong Peng et al: "Design and implementation of CAPWAP-based AP simulator", Dec. 2012, total 3 pages.

Ahmed S. A. Mubarak et al: "New CAPWAP architectures for IEEE 802.11ad based Wi-Fi/WiGig WLANs", Mar. 15, 2018, total 5 pages.

Chinese Notice of Allowance issued in corresponding Chinese Application No. 201980103296.0, dated Apr. 23, 2023, pp. 1-5.

* cited by examiner

COMMUNICATION METHOD AND APPARATUS FOR SENDING CONTROL PLANE MESSAGES IN A TARGET CHANNEL

CROSS-REFERENCE TO RELATED APPLICATIONS

This application is a continuation of International Application No. PCT/CN2019/128469, filed on Dec. 25, 2019, the disclosure of which is hereby incorporated by reference in its entirety.

TECHNICAL FIELD

This application relates to the field of communication technologies, and in particular, to a communication method and apparatus.

BACKGROUND

Currently, according to a control and provisioning of wireless access points (control and provisioning of wireless access points protocol specification, CAPWAP) protocol, a control plane message of a wireless access point (wireless termination point, WTP) may be transmitted between the WTP and an access controller (access controller, AC) through a control channel, and data may be transmitted through a data channel. The control channel does not support concurrency of control plane messages of the WTP. If a message transmitted on the control channel needs to be retransmitted for a reason such as a packet loss, another message to be transmitted on the control channel can be sent only after the message is successfully received. Consequently, transmission efficiency of the control channel is not high.

Currently, the WTP supports access of a plurality of terminals, and the plurality of terminals may transmit control request messages of the plurality of terminals to the AC through the WTP at the same time (or within a short time period), to request to obtain a control message from a network side (where for ease of description subsequently, the control request message of the terminal and the control message are collectively referred to as control plane messages). As a result, if the control channel between the WTP and the AC is used to transmit the control plane message of the terminal, the control channel whose transmission efficiency is not high originally is heavily burdened, and the control channel is easily blocked, resulting in low transmission efficiency of the control plane message of the terminal.

SUMMARY

This application provides a communication method and apparatus, to improve transmission efficiency of a control plane message of a terminal.

According to a first aspect, this application provides a communication method. The method may be implemented by a first communication apparatus or a chip in the first communication apparatus. For example, the first communication apparatus may include an access point or an access controller according to a CAPWAP protocol.

According to the method, the first communication apparatus may obtain a first message and a second message, where both the first message and the second message are control plane messages of terminals. The first communication apparatus may further send the first message and the second message to a second communication apparatus through a target channel, where the target channel is used to transmit a control plane message of a terminal. The target channel includes a channel whose sliding window has a length of N, where N is greater than or equal to 2, and a third message and a fourth message are transmitted in a same sliding window of the target channel. Alternatively, the target channel includes a first channel and a second channel, the first channel is used to carry a third message, the second channel is used to carry a fourth message, and a thread of the first channel is asynchronous with a thread of the second channel.

According to the foregoing method, a control request message of the terminal may be transmitted between the first communication apparatus and the second communication apparatus through the target channel. Because the target channel supports concurrency of a plurality of messages, transmission efficiency of the control request message of the terminal can be improved.

For example, if the first communication apparatus is an access point (or a chip in the access point), the second communication apparatus may be an access controller (or a chip in the access controller). If the first communication apparatus is an access controller (or a chip in the access controller), the second communication apparatus may be an access point (or a chip in the access point).

In a possible example, the first communication apparatus may send a first indication and a second indication to the second communication apparatus, where the first indication is used to determine that the first message is the control plane message of the terminal, and the second indication is used to determine that the second message is the control plane message of the terminal. Therefore, the second communication apparatus may determine, based on the first indication, that the first message is the control plane message of the terminal, and the second communication apparatus may determine, based on the second indication, that the second message is the control plane message of the terminal, so that the second communication apparatus performs corresponding processing based on the control plane messages of the terminals. For example, the second communication apparatus feeds back a response message for the first message and a response message for the second message to the first communication apparatus according to the method provided in this application, to improve communication efficiency and communication reliability.

In a possible example, if the first communication apparatus is the access point, the first communication apparatus may further receive the third message and the fourth message from the terminals, and determine that both the third message and the fourth message are control plane messages of the terminals, where the first message is determined based on the third message, and the second message is determined based on the fourth message. Therefore, after determining that the third message and the fourth message from the terminals are the control plane messages of the terminals, the first communication apparatus may determine the first message and the second message, to improve communication efficiency and communication reliability when the control plane messages of the terminals are forwarded to the access controller.

For example, after identifying that both the third message and the fourth message are RRC messages, the first communication apparatus may determine that both the third message and the fourth message are the control plane messages of the terminals.

For example, when the third message is determined based on the first message, if a message termination of the third message is the first communication apparatus, the first communication apparatus may parse the third message to determine message content of the third message, and determine the first message based on the message content of the third message. If a message termination of the third message is the second communication apparatus, the first communication apparatus may encapsulate the third message to obtain the first message. In this case, the first communication apparatus does not need to parse the third message.

Similarly, when the fourth message is determined based on the second message, if a message termination of the fourth message is the first communication apparatus, the first communication apparatus may parse the fourth message to determine message content of the fourth message, and determine the second message based on the message content of the fourth message. If a message termination of the fourth message is the second communication apparatus, the first communication apparatus may encapsulate the fourth message to obtain the second message. In this case, the first communication apparatus does not need to parse the fourth message.

In another possible example, if the first communication apparatus is the access controller, the first communication apparatus may further receive a fifth message and a sixth message from the second communication apparatus through a channel whose sliding window has a length of M, where M is greater than or equal to 2, and the fifth message and the sixth message are control plane messages of the terminals. Alternatively, the first communication apparatus may receive a fifth message from the second communication apparatus through a third channel, and receive a sixth message from the second communication apparatus through a fourth channel, where a thread of the third channel is asynchronous with a thread of the fourth channel, and the fifth message and the sixth message are control plane messages of the terminals. In this example, the first communication apparatus may determine the first message and the second message respectively in response to the fifth message and the sixth message from the second communication apparatus. Both the fifth message and the sixth message are the control plane messages of the terminals. Therefore, communication efficiency and reliability can be improved when the first communication apparatus sends the control plane messages of the terminals to the second communication apparatus after receiving the control plane messages of the terminals.

In this example, the first communication apparatus may further determine, based on a third indication and a fourth indication from the second communication apparatus, that the fifth message and the sixth message are the control plane messages of the terminals.

If the target channel includes the channel whose sliding window has the length of N, the first communication apparatus may further send a seventh message to the second communication apparatus through the target channel or a control channel, where the seventh message is used to configure a value of N. Alternatively, the first communication apparatus may receive an eighth message from the second communication apparatus through the target channel or a control channel, where the eighth message is used to configure a value of N. Therefore, the first communication apparatus or the second communication apparatus may initiate a process of adjusting the sliding window of the target channel, to adjust the sliding window of the target channel in real time based on load and a communication queue length, and optimize communication efficiency and communication reliability.

If the target channel includes the first channel and the second channel, and the first channel and the second channel each correspond to a resource in a first resource pool, the first communication apparatus may further send a ninth message to the second communication apparatus through the target channel or a control channel between the first communication apparatus and the second communication apparatus, where the ninth message is used to configure a quantity of resources in the first resource pool. Alternatively, the first communication apparatus may receive a tenth message from the second communication apparatus through the target channel or a control channel between the first communication apparatus and the second communication apparatus, where the tenth message is used to configure a quantity of resources in the first resource pool. Therefore, the first communication apparatus or the second communication apparatus may initiate a process of adjusting a quantity of target channels, to adjust, in real time based on load and a communication queue length, a capability of concurrently transmitting control plane messages of the terminals, and optimize communication efficiency and communication reliability.

According to a second aspect, this application provides a communication method. The method may be implemented by a second communication apparatus or a chip in the second communication apparatus. For example, the second communication apparatus may include an access point or an access controller according to a CAPWAP protocol.

According to the method, the second communication apparatus may receive a first message and a second message from a first communication apparatus through a target channel, where both the first message and the second message are control plane messages of terminals. The target channel includes a channel whose sliding window has a length of N, where N is greater than or equal to 2, and a third message and a fourth message are transmitted in a same sliding window of the target channel. Alternatively, the target channel includes a first channel and a second channel, the first channel is used to carry a third message, the second channel is used to carry a fourth message, and a thread of the first channel is asynchronous with a thread of the second channel.

The second communication apparatus may further receive a first indication and a second indication from the first communication apparatus, where the first indication is used to determine that the first message is the control plane message of the terminal, and the second indication is used to determine that the second message is the control plane message of the terminal. Therefore, the second communication apparatus may determine, based on the first indication and the second indication, that the first message and the second message are the control plane messages of the terminals, to improve communication reliability and communication efficiency.

In a possible example, after receiving the first message and the second message, the access controller may send a response message to the first communication apparatus.

In a specific example, if the second communication apparatus is an access point, the second communication apparatus may further send a fifth message and a sixth message to the first communication apparatus through a channel whose sliding window has a length of M, where M is greater than or equal to 2, and the fifth message and the sixth message are control plane messages of the terminals. Alternatively, the second communication apparatus may send a fifth message to the first communication apparatus through a third channel, and send a sixth message to the first communication apparatus through a fourth channel, where a thread of the third channel is asynchronous with a thread of the fourth channel, and the fifth message and the sixth message are control plane messages of the terminals. The first message and the second message may be sent by the first communication apparatus in response to the fifth message and the sixth message.

In this example, the second communication apparatus may further send a third indication and a fourth indication to the first communication apparatus, where the third indication is used to determine that the fifth message is the control plane message of the terminal, and the fourth indication is used to determine that the sixth message is the control plane message of the terminal.

In another possible example, if the second communication apparatus is an access point, the first communication apparatus may further send the first message to the terminal corresponding to the first message; and/or the first communication apparatus may send the second message to the terminal corresponding to the second message. Therefore, the control plane messages from the first communication apparatus are distributed to the terminals.

For example, if the target channel includes the channel whose sliding window has the length of N, the second communication apparatus may further receive a seventh message from the first communication apparatus through the target channel or a control channel between the first communication apparatus and the second communication apparatus, where the seventh message is used to configure a value of N. Alternatively, the second communication apparatus may send an eighth message to the first communication apparatus through the target channel or a control channel between the first communication apparatus and the second communication apparatus, where the eighth message is used to configure a value of N.

For example, if the target channel includes the first channel and the second channel, and the first channel and the second channel each correspond to a resource in a first resource pool, the second communication apparatus may further receive a ninth message from the first communication apparatus through the target channel or a control channel, where the ninth message is used to configure a quantity of resources in the first resource pool. Alternatively, the second communication apparatus may send a tenth message to the first communication apparatus through the target channel or a control channel, where the tenth message is used to configure a quantity of resources in the first resource pool.

According to a third aspect, an embodiment of this application provides a communication apparatus. The communication apparatus may include an access point or an access controller according to a CAPWAP protocol. For example, the communication apparatus may be configured to perform a function, a step, or an operation provided in any one of the first aspect or the possible designs of the first aspect. The communication apparatus may implement functions, steps, or operations in the foregoing methods in a form of a hardware structure, a software module, or a combination of a hardware structure and a software module. For example, functional modules corresponding to the functions, the steps, or the operations in the foregoing methods may be disposed in the communication apparatus, to support the communication apparatus in performing the foregoing methods.

When the communication apparatus shown in the third aspect is implemented by using the software module, the communication apparatus may include a communication module and a processing module that are coupled to each other. The communication module may be configured to support the communication apparatus in performing communication. The processing module may be used by the communication apparatus to perform a processing operation, for example, generate information/a message that needs to be sent by the communication module, or process a signal received by the communication module to obtain information/a message.

For example, the processing module may be configured to obtain a first message and a second message, where both the first message and the second message are control plane messages of terminals. The communication module may be configured to send the first message and the second message to a second communication apparatus through a target channel, where the target channel is used to transmit a control plane message of a terminal. The target channel includes a channel whose sliding window has a length of N, where N is greater than or equal to 2, and a third message and a fourth message are transmitted in a same sliding window of the target channel. Alternatively, the target channel includes a first channel and a second channel, the first channel is used to carry a third message, the second channel is used to carry a fourth message, and a thread of the first channel is asynchronous with a thread of the second channel.

In addition, the communication module may be further configured to send a first indication and a second indication to the second communication apparatus, where the first indication is used to determine that the first message is the control plane message of the terminal, and the second indication is used to determine that the second message is the control plane message of the terminal.

In a possible example, the communication apparatus is an access point, and the communication module may be further configured to receive the third message and the fourth message from the terminals. The processing module may be further configured to determine that both the third message and the fourth message are control plane messages of the terminals, where the first message is determined based on the third message, and the second message is determined based on the fourth message. Specifically, the processing module may determine that both the third message and the fourth message are RRC messages.

In another specific example, if a message termination of the third message is the communication apparatus, the processing module is specifically configured to: parse the third message to determine message content of the third message, and determine the first message based on the message content of the third message. Alternatively, if a message termination of the third message is the second communication apparatus, the processing module may encapsulate the third message to obtain the first message.

Similarly, if a message termination of the fourth message is the communication apparatus, the processing module may parse the fourth message to determine message content of the fourth message, and determine the second message based on the message content of the fourth message. Alternatively, if a message termination of the fourth message is the second communication apparatus, the processing module may encapsulate the fourth message to obtain the second message.

For example, if the communication apparatus is an access controller, the communication module may be further configured to receive a fifth message and a sixth message from the second communication apparatus through a channel whose sliding window has a length of M, where M is greater than or equal to 2, and the fifth message and the sixth message are control plane messages of the terminals. Alternatively, the communication module may be further configured to: receive a fifth message from the second communication apparatus through a third channel, and receive a sixth message from the second communication apparatus through a fourth channel, where a thread of the third channel is asynchronous with a thread of the fourth channel, and the fifth message and the sixth message are control plane messages of the terminals. The processing module may be configured to: determine the first message in response to the fifth message; and determine the second message in response to the sixth message.

In this example, the communication module may be further configured to receive a third indication and a fourth indication from the second communication apparatus. The third indication is used to determine that the fifth message is the control plane message of the terminal, and the fourth indication is used to determine that the sixth message is the control plane message of the terminal.

In addition, if the target channel includes the channel whose sliding window length is N, the communication module may further send a seventh message to the second communication apparatus through the target channel or a control channel, where the seventh message is used to configure a value of N. Alternatively, the communication module may further receive an eighth message from the second communication apparatus through the target channel or a control channel, where the eighth message is used to configure a value of N.

If the target channel includes the first channel and the second channel, and the first channel and the second channel each correspond to a resource in a first resource pool, the communication module may be further configured to send a ninth message to the second communication apparatus through the target channel or a control channel between the communication apparatus and the second communication apparatus, where the ninth message is used to configure a quantity of resources in the first resource pool. Alternatively, the communication module may be further configured to receive a tenth message from the second communication apparatus through the target channel or a control channel between the communication apparatus and the second communication apparatus, where the tenth message is used to configure a quantity of resources in the first resource pool.

When the communication apparatus shown in the third aspect is implemented by using a hardware component, the communication apparatus may include a processor, configured to perform a function, a step, or an operation provided in any one of the first aspect and/or the possible designs of the first aspect. The communication apparatus may further include a memory. The memory may be configured to store instructions, and the processor may be configured to invoke the instructions from the memory and run the instructions, to perform a function, a step, or an operation provided in any one of the first aspect and/or the possible designs of the first aspect. The communication apparatus may further include a communication interface, used by the communication apparatus to perform communication in a wired and/or wireless manner. The communication interface is, for example, a communication port used by the communication apparatus to communicate with the second communication apparatus.

For example, the processor may be configured to perform the step performed by the processing module in the third aspect. The communication interface may be configured to perform the step performed by the communication module in the third aspect. Due to a space limitation, specific operations performed by the processor and the communication interface are not described herein. For the step performed by the processor, refer to the step performed by the processing module in the third aspect. For the step performed by the communication interface, refer to the step performed by the communication module in the third aspect.

According to a fourth aspect, an embodiment of this application provides a communication apparatus. The communication apparatus may include an access point or an access controller according to a CAPWAP protocol. For example, the communication apparatus may be configured to perform a function, a step, or an operation provided in any one of the second aspect or the possible designs of the second aspect. The communication apparatus may implement functions, steps, or operations in the foregoing methods in a form of a hardware structure, a software module, or a combination of a hardware structure and a software module. For example, functional modules corresponding to the functions, the steps, or the operations in the foregoing methods may be disposed in the communication apparatus, to support the communication apparatus in performing the foregoing methods.

When the communication apparatus shown in the fourth aspect is implemented by using the software module, the communication apparatus may include a communication module and a processing module that are coupled to each other. The communication module may be configured to support the communication apparatus in performing communication. The processing module may be used by the communication apparatus to perform a processing operation, for example, generate information/a message that needs to be sent by the communication module, or process a signal received by the communication module to obtain information/a message.

Specifically, the communication module may be configured to receive a first message and a second message from a first communication apparatus through a target channel, where both the first message and the second message are control plane messages of terminals. The target channel includes a channel whose sliding window has a length of N, where N is greater than or equal to 2, and a third message and a fourth message are transmitted in a same sliding window of the target channel. Alternatively, the target channel includes a first channel and a second channel, the first channel is used to carry a third message, the second channel is used to carry a fourth message, and a thread of the first channel is asynchronous with a thread of the second channel.

In addition, the communication module may further receive a first indication and a second indication from the first communication apparatus, where the first indication is used to determine that the first message is the control plane message of the terminal, and the second indication is used to determine that the second message is the control plane message of the terminal. Therefore, the processing module may determine that the first message and the second message are the control plane messages of the terminals.

In a possible example, the communication apparatus is an access point, and the communication module is further configured to send a fifth message and a sixth message to the first communication apparatus through a channel whose sliding window has a length of M, where M is greater than or equal to 2, and the fifth message and the sixth message are control plane messages of the terminals; or send a fifth message to the first communication apparatus through a third channel, and send a sixth message to the first communication apparatus through a fourth channel, where a thread of the third channel is asynchronous with a thread of the fourth channel, and the fifth message and the sixth message are control plane messages of the terminals.

In this example, the communication module may be further configured to send a third indication and a fourth indication to the first communication apparatus, where the third indication is used to determine that the fifth message is the control plane message of the terminal, and the fourth indication is used to determine that the sixth message is the control plane message of the terminal.

In another possible example, the communication apparatus is an access point, and the communication module may be further configured to: send the first message to the terminal corresponding to the first message; and send the second message to the terminal corresponding to the second message.

For example, if the target channel includes the channel whose sliding window has the length of N, the communication module may be further configured to receive a seventh message from the first communication apparatus through the target channel or a control channel between the first communication apparatus and the communication apparatus, where the seventh message is used to configure a value of N. Alternatively, the communication module may be further configured to send an eighth message to the first communication apparatus through the target channel or a control channel between the first communication apparatus and the communication apparatus, where the eighth message is used to configure a value of N.

For example, if the target channel includes the first channel and the second channel, and the first channel and the second channel each correspond to a resource in a first resource pool, the communication module may be further configured to receive a ninth message from the first communication apparatus through the target channel or a control channel, where the ninth message is used to configure a quantity of resources in the first resource pool. Alternatively, the communication module may be further configured to send a tenth message to the first communication apparatus through the target channel or a control channel, where the tenth message is used to configure a quantity of resources in the first resource pool.

When the communication apparatus shown in the fourth aspect is implemented by using a hardware component, the communication apparatus may include a processor, configured to perform a function, a step, or an operation provided in any one of the second aspect and/or the possible designs of the second aspect. The communication apparatus may further include a memory. The memory may be configured to store instructions, and the processor may be configured to invoke the instructions from the memory and run the instructions, to perform a function, a step, or an operation provided in any one of the second aspect and/or the possible designs of the second aspect. The communication apparatus may further include a communication interface, used by the communication apparatus to perform communication in a wired and/or wireless manner. The communication interface is, for example, a communication port used by the communication apparatus to communicate with the first communication apparatus.

For example, the processor may be configured to perform the step performed by the processing module in the fourth aspect. The communication interface may be configured to perform the step performed by the communication module in the fourth aspect. Due to a space limitation, specific operations performed by the processor and the communication interface are not described herein. For the step performed by the processor, refer to the descriptions of the step performed by the processing module in the fourth aspect. For the step performed by the communication interface, refer to the descriptions of the step performed by the communication module in the fourth aspect.

According to a fifth aspect, this application provides a communication system. The communication system may include the communication apparatus shown in the third aspect and the communication apparatus shown in the fourth aspect. The communication apparatus shown in the third aspect may include a software module and/or a hardware component, and the communication apparatus shown in the fourth aspect may include a software module and/or a hardware component.

For example, the communication apparatus shown in the third aspect is a first communication apparatus, and the communication apparatus shown in the fourth aspect is a second communication apparatus. The communication system provided in this embodiment of this application may be used to perform the following operations: The first communication apparatus obtains a first message and a second message, where both the first message and the second message are control plane messages of terminals. The first communication apparatus sends the first message and the second message to the second communication apparatus through a target channel, where the target channel is used to transmit a control plane message of a terminal. Correspondingly, the second communication apparatus receives the first message and the second message. The target channel includes a channel whose sliding window has a length of N, where N is greater than or equal to 2, and a third message and a fourth message are transmitted in a same sliding window of the target channel. Alternatively, the target channel includes a first channel and a second channel, the first channel is used to carry a third message, the second channel is used to carry a fourth message, and a thread of the first channel is asynchronous with a thread of the second channel.

According to a sixth aspect, this application provides a computer-readable storage medium. The computer storage medium stores instructions (also referred to as a program). When the instructions are invoked and executed on a computer, the computer is enabled to perform the method in any one of the first aspect or the possible designs of the first aspect, or is enabled to perform the method in any one of the second aspect or the possible designs of the second aspect.

According to a seventh aspect, this application provides a computer program product. The computer program product may include instructions. When the computer program product runs on a computer, the computer is enabled to perform the method in any one of the first aspect or the possible designs of the first aspect, or is enabled to perform the method in any one of the second aspect or the possible designs of the second aspect.

According to an eighth aspect, this application provides a chip or a chip system including the chip. The chip may include a processor. The chip may further include a memory and/or a communication interface (or a communication module and a transceiver). The chip may be configured to perform the method in any one of the first aspect or the possible designs of the first aspect, or configured to perform the method in any one of the second aspect or the possible designs of the second aspect. The chip system may include the foregoing chip, or may include the foregoing chip and another discrete component such as a memory and a communication interface (or a communication module and a transceiver).

For beneficial effects in the second aspect to the eighth aspect and the possible designs of the second aspect to the eighth aspect, refer to the descriptions of the beneficial effects of the method in any one of the first aspect or the possible designs of the first aspect or any one of the second aspect or the possible designs of the second aspect.

DESCRIPTION OF EMBODIMENTS

The following describes in detail embodiments of this application with reference to the accompanying drawings.

Figure 1:
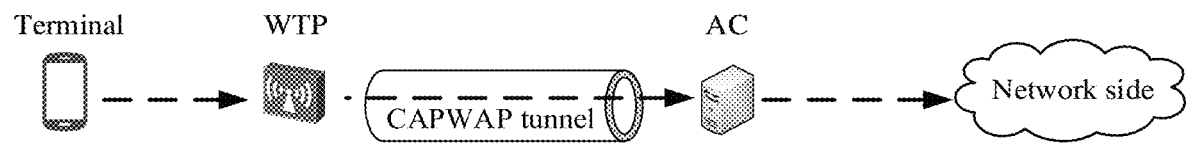
FIG. 1 is a schematic diagram of a structure of a communication system according to an embodiment of this application.

A communication method provided in embodiments of this application may be used in a communication system shown in FIG. 1. The communication system in FIG. 1 may perform communication according to a CAPWAP protocol. The communication system may include a wireless termination point (wireless termination point, WTP) and an access controller (access controller, AC). The AC is configured to control and manage the WTP in a wireless local area network.

A packet of the WTP may be forwarded by the AC in a centralized manner. For example, as shown in FIG. 1, after a packet sent by a terminal reaches the WTP, the WTP encapsulates the packet to obtain a CAPWAP packet, and sends the encapsulated packet to the AC. Then, the AC decapsulates the CAPWAP packet to obtain the original packet of the terminal, and forwards the original packet. The terminal may be a device having an interface to a wireless medium (wireless medium, WM). The terminal may be a wireless terminal, for example, a laptop computer (laptop computer), a tablet computer (tablet computer), or a mobile phone.

In addition, the AC shown in FIG. 1 may manage a plurality of WTPs. There is one CAPWAP tunnel between each WTP terminal and the AC. After receiving a packet sent by the terminal through the CAPWAP tunnel, the AC stores a mapping relationship between an address of the terminal and a CAPWAP tunnel entry of the tunnel. The CAPWAP tunnel entry includes an IP address of the WTP, a port number of the WTP for the CAPWAP tunnel, and a port number of the AC for the CAPWAP tunnel. When the AC receives a packet from the internet (internet) and needs to send the packet to the terminal, the AC may find the CAPWAP tunnel entry based on the mapping between the address of the terminal and the CAPWAP tunnel entry, encapsulate the packet from the internet based on the found CAPWAP tunnel entry, and then send the packet.

Specifically, two channels are currently defined in the CAPWAP protocol: a control channel (also referred to as a CAPWAP control channel) and a data channel (also referred to as a CAPWAP data channel). The CAPWAP control channel is a bidirectional channel, and is defined by using an IP address of an AC, an IP address of a WTP, an AC-side control port (a port number of the port, for example, 5246), a WTP-side control port (a port number of the port, for example, 5246), and a transport layer protocol (for example, the user datagram protocol (user datagram protocol, UDP)). CAPWAP control plane messages, for example, discovery messages, may be sent and received through the control channel. It should be understood that there is a difference between a control plane message of the CAPWAP and a control plane message of the terminal. The control plane message of the terminal includes a non-access stratum (non-access stratum, NAS) message from the terminal or sent to the terminal, or the like. The CAPWAP data channel is a bidirectional channel, and is defined by using the IP address of the AC, the IP address of the WTP, an AC-side data port (a port number of the port, for example, 5247), a WTP-side data port (a port number of the port, for example, 5247), and a transport layer protocol (for example, the UDP). Data messages may be sent and received through the data channel.

Figure 2:
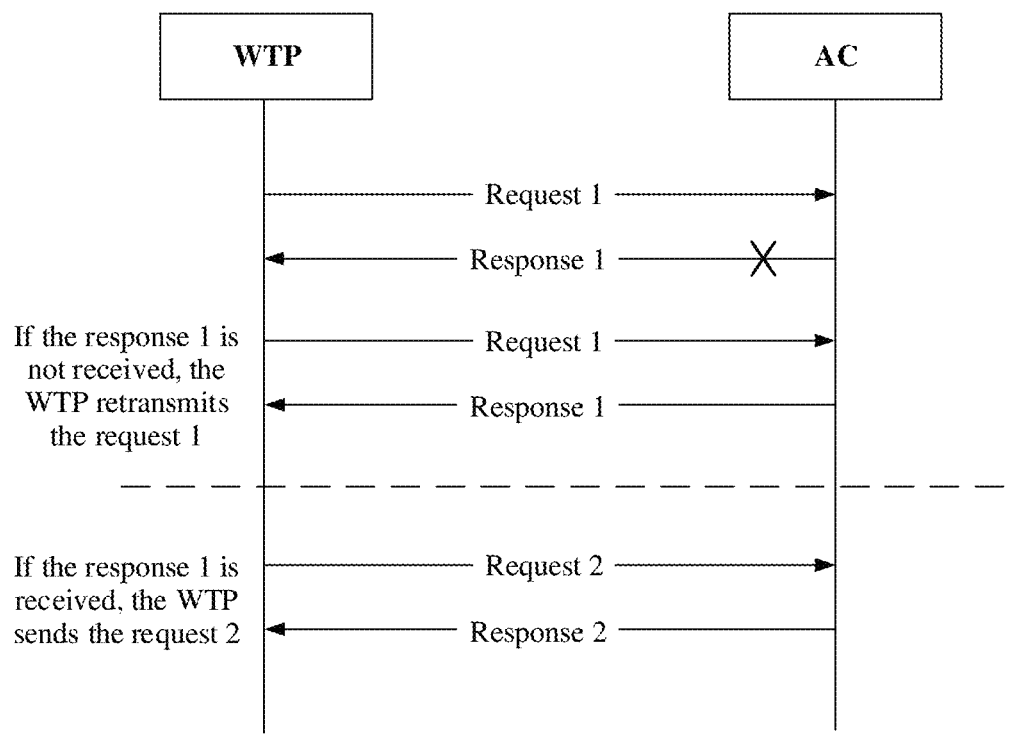
FIG. 2 is a schematic diagram of a CAPWAP-based message sending procedure according to an embodiment of this application.

The control channel between the AC and the WTP does not support concurrency of messages. For example, the WTP sends a control request (request) message (also referred to as a request message) to the AC. As shown in FIG. 2, a plurality of control request messages that need to be sent by the WTP to the AC are respectively denoted as a request 1, a request 2, and the like, and response messages corresponding to the control request messages are denoted as a response 1, a response 2, and the like. During sending, the WTP can continue to send the request 2 only when the request 1 is processed completely, that is, the WTP receives the response 1 from the AC (where the response 1 indicates that the AC receives the request 1); the request 1 needs to be retransmitted (also referred to as resent) before the request 2 is sent when the request 1 is not processed completely. Consequently, currently, transmission efficiency of the control channel between the AC and the WTP is not high.

When the control plane message of the terminal is transmitted, if the control channel is still used, the control channel whose transmission efficiency is not high originally is heavily burdened, and the control plane message of the terminal cannot be forwarded in a timely manner, resulting in low transmission efficiency of the control plane message of the terminal. To resolve the technical problem, embodiments of this application provide a communication method, to improve efficiency of transmitting a control plane message of a terminal according to a CAPWAP protocol.

It should be understood that the control plane message of the terminal in this application includes a control message that is sent by a network side to the terminal, and/or a control request message that is sent by the terminal and that is used to request a control message.

Figure 3:
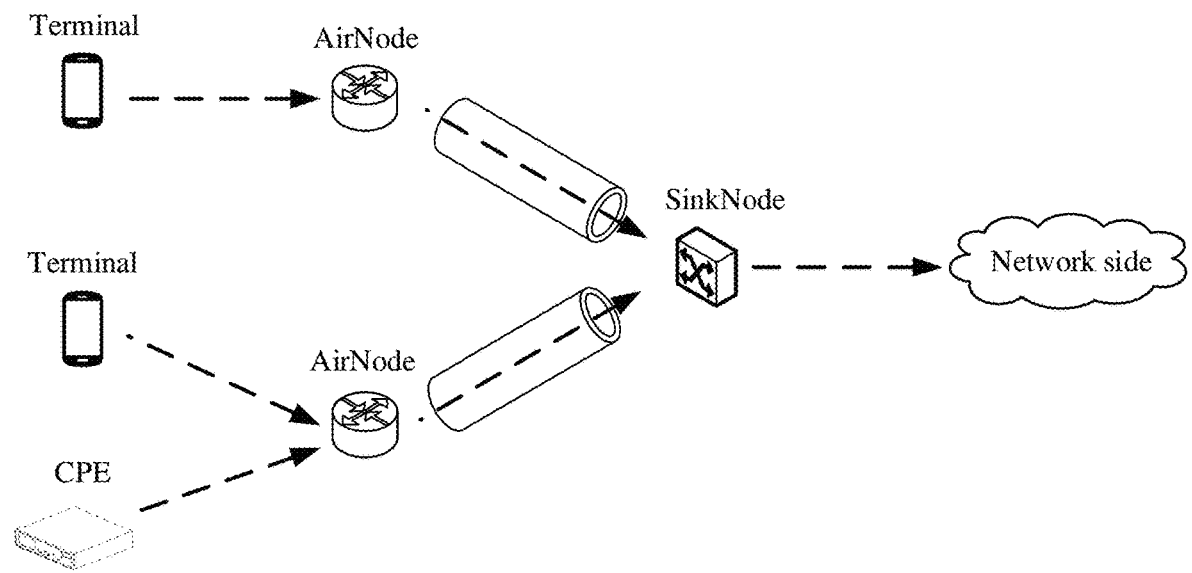
FIG. 3 is a schematic diagram of a structure of another communication system according to an embodiment of this application.

It should be understood that embodiments of this application may be further applied to a communication system shown in FIG. 3. A terminal may access a network through an AirNode (AirNode) and a SinkNode (SinkNode). The terminal may include customer premises equipment (customer premises equipment, CPE). For example, the communication system may be applied to an industrial manufacturing scenario or another application scenario. Specifically, a network may be formed by using the terminal, the AirNode, and the SinkNode, and an application scenario such as industrial manufacturing is managed and controlled through the network.

The CPE may be a terminal device (for example, a device or a node that has a mobile communication function in the internet of things) that conforms to a definition of a 3GPP protocol. In addition, the CPE may also serve as a common relay node. For example, the CPE may further include a device configured to provide a signal such as a wireless fidelity (wireless fidelity, Wi-Fi) signal or a ZigBee (ZigBee) signal.

Figure 4:
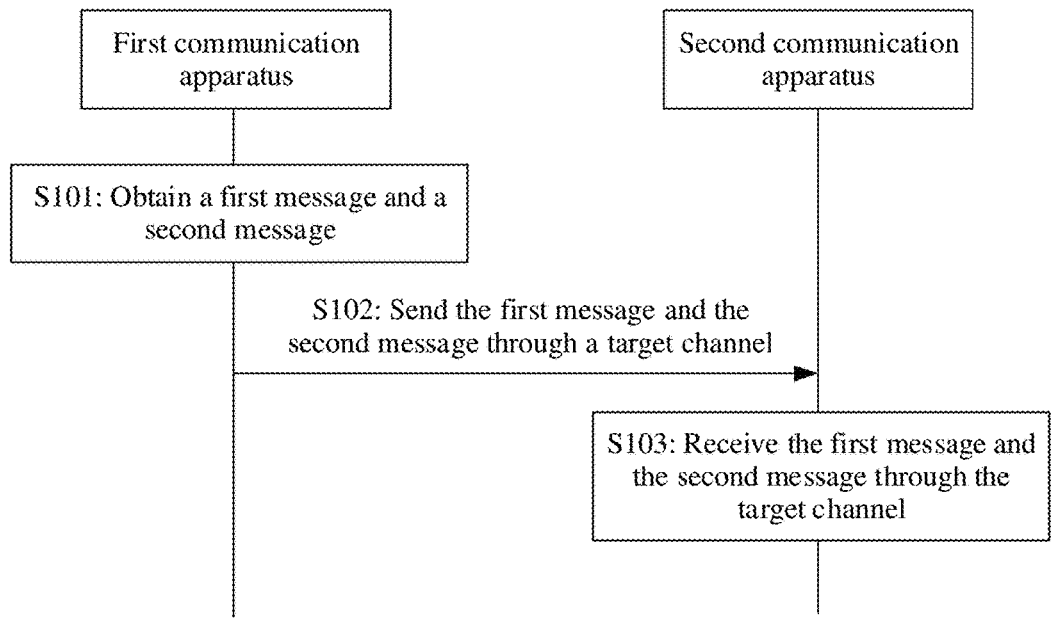
FIG. 4 is a schematic flowchart of a communication method according to an embodiment of this application.

As shown in FIG. 4, an embodiment of this application provides a communication method. The communication method may be performed by a first communication apparatus and a second communication apparatus, to improve transmission efficiency of a control plane message of a terminal between the first communication apparatus and the second communication apparatus. The first communication apparatus and the second communication apparatus each are one of an access point and an access controller. For example, the first communication apparatus is an access point, and the second communication apparatus is an access controller; or the second communication apparatus is an access point, and the first communication apparatus is an access controller.

In this application, the access point may be an industry base station device. The access point may have a basic function of a conventional base station (for example, a small cell in a long term evolution (long term evolution, LTE) communication system). The access point may further have functions such as NAS message processing, NAS security, user access authentication and authorization, tracking area list management, and dedicated bearer setup. Specifically, the access point may be the WTP shown in FIG. 1 or the AirNode shown in FIG. 3.

The AirNode shown in FIG. 3 may be used as the access point in this application. In addition, the access point may alternatively be a (radio) access network ((radio) access network, (R)AN) device in a 5G mobile communication public network architecture, for example, a gNB.

The access controller may be an industry management and control platform. The access controller may be responsible for terminal subscription management of an entire network, and is configured to provide a mobility management function, a session management function, a management function for an access point (for example, the AirNode), an external API function, and the like. In addition, the AirNode may be a core network element in the 5G mobile communication public network architecture, for example, an access and mobility management function (access and mobility management function, AMF) network element or a session management function (Session Management Function, SMF) network element. Specifically, the access controller may be the AC shown in FIG. 1 or the SinkNode shown in FIG. 3. In addition, the access controller may alternatively be a node that is co-located with a core network element such as an AMF or an SMF in a 5G mobile communication network architecture, or the like.

As shown in FIG. 4, the communication method provided in this embodiment of this application may include the following steps.

S101: The first communication apparatus obtains a first message and a second message.

Both the first message and the second message are control plane messages of terminals. A control plane message of a terminal may be used for control plane management of the terminal, for example, used for management such as service establishment, service release, or mobility management of the terminal. Alternatively, a control plane message of a terminal is used to request a network side to deliver a message used for control plane management of the terminal. The control plane message of the terminal is, for example, a NAS message of the terminal.

S102: The first communication apparatus sends the first message and the second message to the second communication apparatus through a target channel.

The target channel is used to transmit the control plane message of the terminal. The target channel may not be a control channel between the first communication apparatus and the second communication apparatus, and the target channel may not be a data channel between the first communication apparatus and the second communication apparatus. In other words, the target channel is a channel other than the control channel and the data channel.

The target channel may include a channel whose sliding window has a length of N (in other words, the target channel supports sending of N messages in a same sliding window), where N is greater than or equal to 2, and the first message and the second message may be transmitted in a same sliding window of the target channel. Alternatively, the target channel may include a first channel and a second channel. The first channel is used to carry the first message, and the second channel is used to carry the second message. A thread (or a process, where one process may include one or more threads) of the first channel is asynchronous with a thread of the second channel (in other words, the first channel and the second channel correspond to different threads/processes).

S103: The second communication apparatus receives the first message and the second message through the target channel.

According to the foregoing method, a control request message of the terminal may be transmitted between the first communication apparatus and the second communication apparatus through the target channel. Because the target channel supports concurrency of a plurality of messages, transmission efficiency of the control request message of the terminal can be improved.

In an implementation of Sim, if the first communication apparatus is an access point, the first message and/or the second message may be determined by the first communication apparatus based on the control plane message from the terminal.

For example, the access point may receive a third message and a fourth message from the terminals, where both the third message and the fourth message are control plane messages of the terminals. Then, the access point may determine the first message based on the third message, and determine the second message based on the fourth message.

The third message and the fourth message may come from a same terminal, or respectively come from two different terminals, and the two terminals access the access point. The third message and/or the fourth message may be control request messages/a control request message (for example, access request messages/an access request message) of the terminals/terminal, and are/is used to request the network side (for example, an access controller or another network side node) to send a control message to the terminals/terminal. The control request message is, for example, an access request message sent by the terminal.

In addition, when determining the first message and the second message based on the third message and the fourth message, the access point needs to consider whether a termination of the third message and the fourth message is the access point or the access controller. An identifier of the termination may be encapsulated in a message. A NAS message is used as an example. When the identifier of the termination encapsulated in the NAS message is an identifier of the access point, it indicates that the termination of the NAS message (termination of the NAS protocol) is the access point. On the contrary, if the identifier of the termination encapsulated in the NAS message is an identifier of the access controller, it indicates that the termination of the NAS message is the access controller.

A process of determining the first message based on the third message is used as an example. If the access point determines that the termination of the third message is the access point, the access point may parse the third message to obtain message content of the third message. The access point may further determine the first message based on the message content of the third message, where the first message may carry the message content of the third message.

In addition, if the access point determines that the termination of the third message is the access controller, the access point may not parse message content of the third message, but directly transparently transmits the third message to the access controller. Specifically, the access point may encapsulate all content of the third message in the first message, and send the first message to the access controller.

Similarly, the access point may determine the termination of the fourth message, and determine the second message based on the fourth message.

It should be understood that the first message and the second message meet a communication protocol between the access point and the access controller. For example, if a CAPWAP protocol is used between the access point and the access controller, the first message and the second message are encapsulated in CAPWAP packets.

For example, before performing S102, the first communication apparatus may determine that the first message and the second message are the control plane messages of the terminals. If the first communication apparatus may determine that the first message and the second message are not the control plane messages of the terminals, the first communication apparatus does not perform the step shown in S102. An example in which the first communication apparatus is the access point is used. If the access point identifies that both the third message and the fourth message received from the terminals are data messages (for example, user plane messages carried in packet data units (packet data units, PDUs)), the access point does not perform the step shown in S102. In this case, the access point may separately transmit the third message and the fourth message through a data channel between the access point and the access controller. In addition, if the access point identifies that only one of the third message and the fourth message is the control plane message of the terminal, the access point may transmit the control plane message through the target channel. If the other message is a data message, the access point may send the message through the data channel. Similarly, the access controller may send the first message and the second message based on a message type of the first message and a message type of the second message.

In addition, if the first communication apparatus is the access point, the first communication apparatus may send a first indication and a second indication to the access controller. The first indication is used to determine that the first message is the control plane message of the terminal, and the second indication is used to determine that the second message is the control plane message of the terminal. Therefore, the second communication apparatus may learn, based on the first message and the second message, that both the first message and the second message are the control plane messages of the terminals.

For example, the first indication may be carried in the first message, for example, may be a specific bit carried in the first message. When determining that the first message carries the first indication, the access controller may determine that the first message is the control plane message of the terminal. Specifically, the first indication may be carried in a packet header of the first message. Similarly, the second indication may be used to determine that the second message is the control plane message of the terminal. The second indication may be carried in the first message.

The first indication and/or the second indication each may be a message type indication, and the message type indication is used to indicate that a message type is a control plane message of a terminal, a control message of an access point, a data message, or a message of another type.

If the first communication apparatus is the access point, the first communication apparatus may further determine, based on an encapsulation protocol of the third message and/or an encapsulation protocol of the fourth message, whether the third message and/or the fourth message are/is the control plane messages/message of the terminals/terminal. For example, when the first communication apparatus identifies that the third message and/or the fourth message are/is radio resource control (radio resource control, RRC) messages/message from the terminals/terminal, the first communication apparatus determines that the third message and/or the fourth message are/is the control plane messages/message of the terminals/terminal. In addition, when the termination of the third message and/or the fourth message is the first communication apparatus, the first communication apparatus may identify whether the third message and/or the fourth message are/is the NAS messages/message. If the third message and/or the fourth message are/is the NAS messages/message, the first communication apparatus determines that the third message and/or the fourth message are/is the control plane messages/message of the terminals/terminal.

In addition, if the first communication apparatus is the access controller, the first communication apparatus may generate the first message and the second message, where the first message and the second message are the control plane messages of the terminals.

For example, if the first communication apparatus is the access controller, the first message and/or the second message may be generated by the first communication apparatus in response to control request messages/a control request message of the terminals/terminal.

For example, after receiving a fifth message from the access point, the access controller may determine the first message in response to the fifth message. The fifth message may be a control request message of the terminal or a control plane message determined by the access point based on the control request message of the terminal; and/or after receiving a sixth message from the access point, the access controller may determine the second message in response to the sixth message, where the sixth message may be a control request message of the terminal or a control plane message determined by the access point based on the control request message of the terminal. For a process of sending the fifth message and/or the sixth message, refer to the descriptions of the first message and/or the second message in this application.

The access controller may determine, based on a third indication from the access point, that the fifth message is the control plane message of the terminal, where the third indication may be carried in the fifth message (for example, carried in a packet header of the fifth message) or independent of the fifth message; and/or the access controller may determine, based on a fourth indication from the access point, that the sixth message is the control plane message of the terminal, where the fourth indication may be carried in the sixth message (for example, carried in a packet header of the sixth message) or independent of the sixth message. For a setting manner of the third indication and/or the fourth indication, refer to the descriptions of the first indication and/or the second indication in this application.

In addition, the access controller may alternatively determine, based on a decision of the access controller, to send a plurality of control messages to one or more terminals, to generate the first message and/or the second message. For example, when the first communication apparatus is the access controller, the first message and/or the second message may include a control plane message sent to the terminal in procedures such as a paging (paging) procedure, a PDU session modification procedure, and a service request (service request) procedure.

In an implementation of S102, the target channel may be a channel between the first communication apparatus and the second communication apparatus other than the control channel and the data channel. The channel supports concurrency of a plurality of messages. In other words, the target channel is a channel whose sliding window has a length greater than 1 other than the control channel and the data channel.

For example, the first communication apparatus may request to establish the target channel. For example, if a port occupied by the control channel is a port 5246 of the access point, and a port occupied by the data channel is a port 5247 of the access point, the first communication apparatus may send a channel establishment request to the second communication apparatus through any port other than the port 5246 and the port 5247, to establish the target channel, and subsequently send the control request message through the target channel. When receiving the channel establishment request, the second communication apparatus may perform processing by using a new resource (for example, a thread or a process). For example, the second communication apparatus may create a new thread or process, and is specially responsible for receiving and processing information on the target channel. The new thread or process is independent of a thread or process of another channel and the threads or processes do not affect each other.

It should be understood that, if the first communication apparatus is the access point, the foregoing process of establishing the target channel may be performed after the first communication apparatus receives the third message and/or the fourth message, or may be performed before the first communication apparatus receives a message that is received earlier in the third message and the fourth message. In addition, the process of establishing the target channel may alternatively be initiated by the second communication apparatus, that is, the second communication apparatus sends a channel establishment request to the access point. For a specific manner, refer to the descriptions provided when the first communication apparatus initiates establishment of the target channel. It should be understood that a process in which the second communication apparatus establishes the target channel may be performed before or after the second communication apparatus obtains the first message and the second message. This is not specifically limited in this application.

In addition, the first communication apparatus and/or the second communication apparatus may configure a quantity of messages that can be sent through the target channel in one sliding window (in other words, configure a length of a sliding window of the target channel), so that the sliding window of the target channel supports concurrency of the plurality of messages. The first communication apparatus and/or the second communication apparatus may further dynamically adjust the length of the sliding window based on a sending queue of the target channel, a channel congestion status, a load status of the access point and/or a load status of the access controller, and the like. For example, the first communication apparatus may send a seventh message to the second communication apparatus, where the seventh message is used to configure the length of the sliding window of the target channel (in other words, is used to configure a value of N, where N is the length of the sliding window). Alternatively, the second communication apparatus may send an eighth message to the first communication apparatus, where the eighth message is used to configure the length of the sliding window of the target channel.

In this example, the first communication apparatus may send the first message and the second message in the sliding window of the target channel. For example, when sending the first message and the second message through the target channel, the first communication apparatus may determine at least one group of message packets (which may be referred to as a first group of message packets below) based on the first message, and determine at least one group of message packets (which may be referred to as a second group of message packets below) based on the second message, where each group of message packets may include one or more message packets (also referred to as packets). Each message packet in the first group of message packets may be used to carry a part or all of content of the first message. Each message packet in the second group of message packets may be used to carry a part or all of content of the second message.

Figure 5:
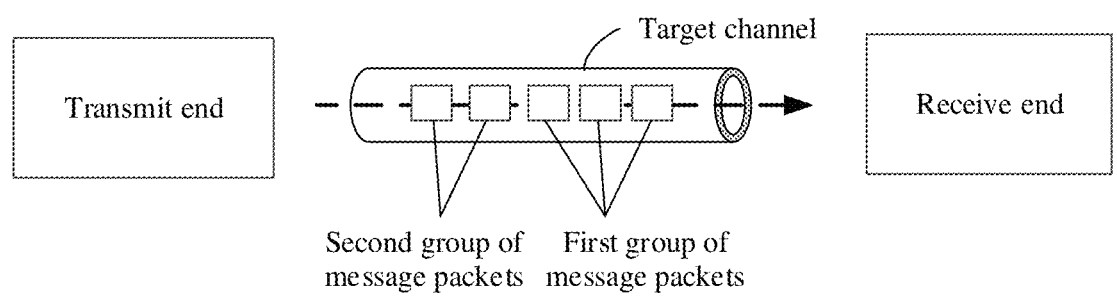
FIG. 5 is a schematic diagram of concurrently sending messages through a target channel according to an embodiment of this application.

As shown in FIG. 5, the first communication apparatus may allocate a same fragment (fragment) identifier (ID) to the message packets in the first group of message packets, and use a fragment offset (offset) to indicate a sequence of the message packets in the first group of message packets, so that the second communication apparatus reassembles the first group of message packets to obtain the first message. In addition, the first communication apparatus may allocate a same fragment ID to the message packets in the second group of message packets, and use a fragment offset to indicate a sequence of the message packets in the second group of message packets, so that the second communication apparatus reassembles the second group of message packets to obtain the second message. The fragment ID allocated to the message packets in the first group of message packets is different from the fragment ID allocated to the message packets in the second group of message packets, to distinguish between the two groups of different message packets.

In addition, the first communication apparatus may allocate different message sequence numbers (sequence numbers, Seq Nums/SNs) to the first message (namely, the first group of message packets or the message packets in the first group of message packets) and the second message (namely, the second group of message packets or the message packets in the second group of message packets). For example, an SN corresponding to the first message is an SN #1 (also referred to as a first sequence number), and an SN corresponding to the second message is an SN #2 (also referred to as a second sequence number).

For example, the fragment IDs, the fragment offsets, and the message sequence numbers that are allocated by the access point to the first message and the second message in this example may be those shown in Table 1.

TABLE 1

| Message | Message packet | Fragment ID | Fragment offset | Message sequence number |
| --- | --- | --- | --- | --- |
| First message | 1 | 1 | 1 | SN#1 |
| | 2 | 1 | 2 | SN#1 |
| | 3 | 1 | 3 | SN#1 |
| Second message | 1 | 2 | 1 | SN#2 |
| | 2 | 2 | 2 | SN#2 |

Due to a packet loss or another reason, when the second communication apparatus fails to receive a group of message packets or a message packet, the second communication apparatus includes an SN of the group of message packets or the message packet in a negative response (also referred to as a response message/negative response message) to be sent to the access point, to indicate the access point to retransmit the group of message packets corresponding to the SN. For example, when the negative response sent by the second communication apparatus to the first communication apparatus carries the SN #2, it indicates that the second communication apparatus does not receive the second message. In this case, the first communication apparatus may retransmit the second group of message packets after receiving the negative response, and does not need to retransmit the first group of message packets based on the negative response. In addition, the first communication apparatus may also maintain a retransmission timer. If the first communication apparatus does not receive a positive response (also referred to as a response message/a positive response message) carrying the SN of the first message and/or the SN of the second message before timing of the retransmission timer expires, the first communication apparatus may retransmit a message that corresponds to the SN and that is not received. The positive response carrying the SN is used to indicate that the second communication apparatus receives a message corresponding to the SN.

In the foregoing process, if the second communication apparatus receives the control plane message of the terminal, the second communication apparatus may send the positive response to the first communication apparatus, to indicate that transmission of the control plane message is completed (or indicate that the control plane message is received). The positive response may carry an SN corresponding to the control plane message. For example, after receiving the first group of message packets, the second communication apparatus may reassemble the first message based on the fragment ID and the fragment offset of the first group of message packets, and submit the first message to an upper layer (for example, an application layer), to perform processing based on the first message. After the upper layer completes processing, the second communication apparatus may send the positive response to the access point.

In the foregoing example, after transmission of a plurality of control plane messages in one sliding window of the target channel is completed, the first communication apparatus may send a control plane message of the terminal other than the first message and the second message to the second communication apparatus based on a sending queue. That transmission of a plurality of control plane messages in one sliding window is completed may mean that the first communication apparatus receives one or more positive responses, where the one or more positive responses carry SNs corresponding to all control plane messages in the sliding window. For example, message packets corresponding to the first message and the second message are transmitted in the sliding window. After receiving a first positive response, the first communication apparatus may determine that transmission of the first message and the second message is completed. The first positive response may carry both the SN corresponding to the first message and the SN corresponding to the second message. Alternatively, after receiving a second positive response and a third positive response, the first communication apparatus determines that transmission of the first message and the second message is completed. The second positive response and the third positive response respectively carry the SN corresponding to the first message and the SN corresponding to the second message.

For example, after receiving a positive response corresponding to a control plane message, the first communication apparatus may send the positive response to a terminal corresponding to the control plane message. The terminal corresponding to the control plane message is a terminal that sends the control plane message.

It should be understood that the fragment ID, the fragment offset, and the SN may be carried in each message packet. For example, the fragment ID, the fragment offset, and the SN are carried in a header (header) (also referred to as a packet header) of each message packet.

For example, after sending a response message (a positive response and/or a negative response) to the first communication apparatus, the second communication apparatus may further buffer the response message. A maximum quantity of response messages that can be buffered by the second communication apparatus may be the length of the sliding window of the target channel. When the first communication apparatus does not receive a response message of a control plane message, retransmission of the control plane message is triggered. Because the second communication apparatus buffers the response message, the second communication apparatus does not need to perform reprocessing, but directly sends the buffered response message to the first communication apparatus, so that a message processing delay can be reduced.

Figure 6:
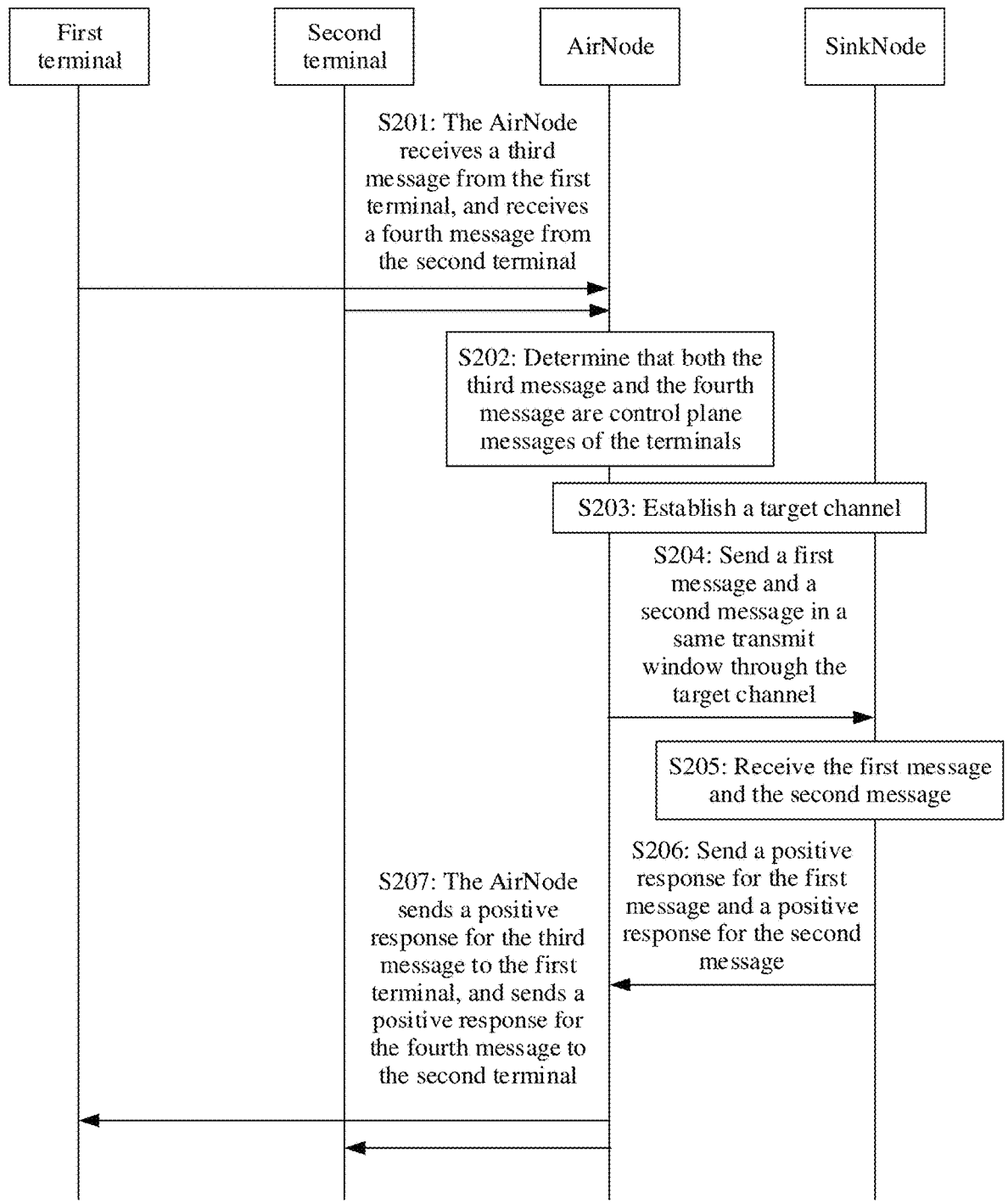
FIG. 6 is a schematic flowchart of another communication method according to an embodiment of this application.

If a first communication apparatus is an AirNode, a second communication apparatus is a SinkNode, and a third message and a fourth message are respectively sent by a first terminal and a second terminal, a communication method provided in an embodiment of this application may include the following steps shown in FIG. 6.

S201: The AirNode receives the third message from the first terminal, and receives the fourth message from the second terminal.

S202: The AirNode determines that both the third message and the fourth message are control plane messages of the terminals.

For example, the AirNode determines that both the third message and the fourth message are NAS messages.

S203: The AirNode establishes a target channel between the AirNode and the SinkNode. The target channel is a channel whose sliding window has a length of N, where N is greater than or equal to 2.

It should be understood that the step shown in S203 may alternatively be performed before S202 or S201. Alternatively, S203 may be replaced with the following step: The AirNode establishes a target channel between the AirNode and the SinkNode.

S204: The AirNode sends a first message and a second message to the SinkNode in a same sliding window through the target channel, where the first message is determined based on the third message, and the second message is determined based on the fourth message.

S205: The SinkNode receives the first message and the second message through the target channel.

S206: If the SinkNode determines that the first message and the second message are received, the SinkNode sends a positive response for the first message and a positive response for the second message to the AirNode. The positive response for the first message is used to indicate that the first message is received, and the positive response for the second message is used to indicate that the second message is received.

The positive response for the first message and the positive response for the second message may be carried in a same message, or carried in different messages. The positive response for the first message and the first message may be carried on a same channel or different channels. The positive response for the second message and the second message may be carried on a same channel or different channels.

Correspondingly, the AirNode receives the positive response for the first message and the positive response for the second message.

S207: The AirNode sends a positive response for the third message to the first terminal, and sends a positive response for the fourth message to the second terminal. The positive response for the third message may be used to indicate that the AirNode has forwarded the third message to the SinkNode (and/or used to indicate that the AirNode receives the first message). The positive response for the fourth message may be used to indicate that the AirNode has forwarded the fourth message to the SinkNode (and/or used to indicate that the AirNode receives the second message).

Figure 7:
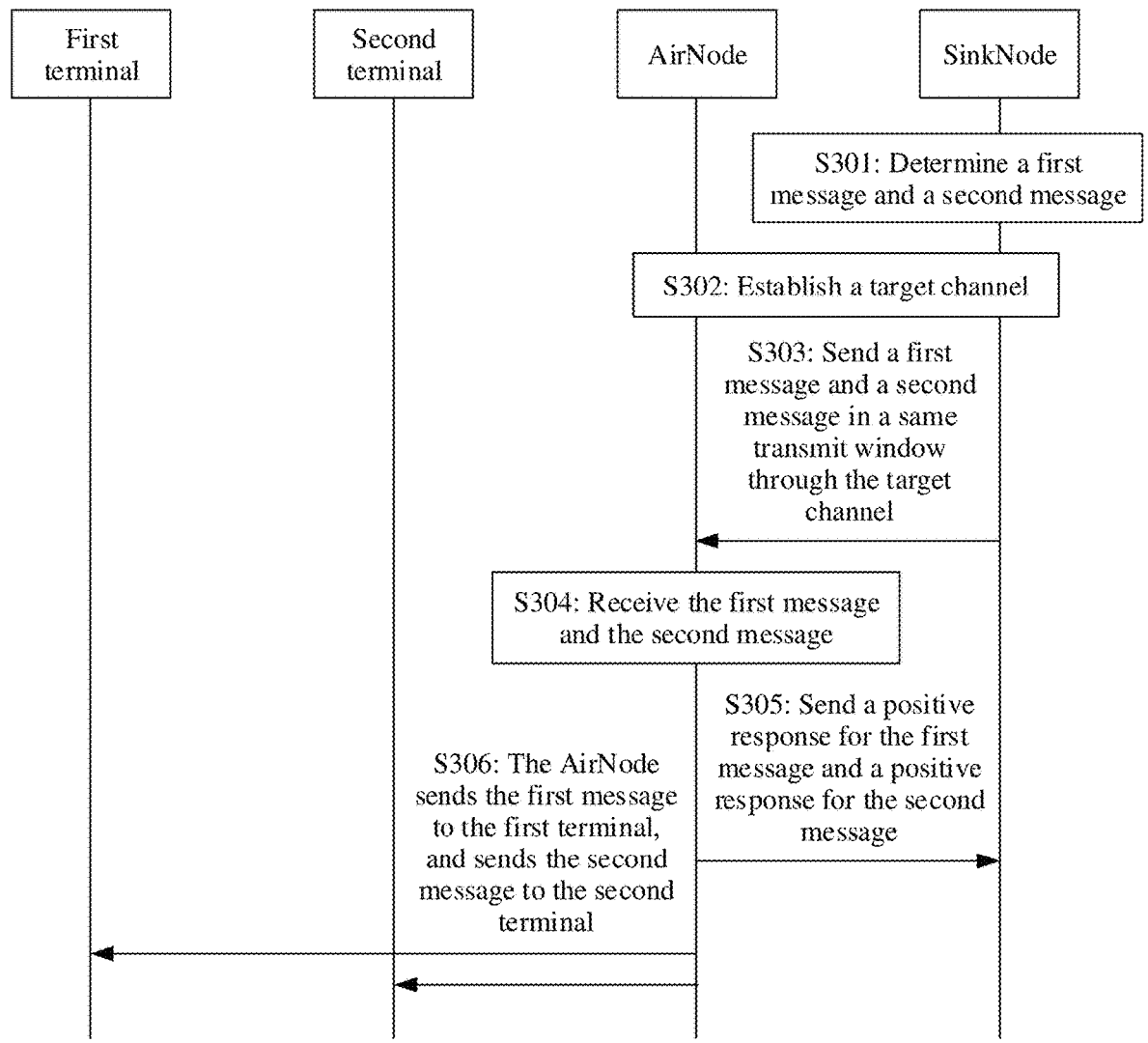
FIG. 7 is a schematic flowchart of another communication method according to an embodiment of this application.

If a first communication apparatus is a SinkNode and the second communication apparatus is an AirNode, a communication method provided in an embodiment of this application may include the following steps shown in FIG. 7.

S301: The SinkNode determines a first message and a second message.

Both the first message and the second message are control plane messages of terminals. The first message and the second message may be generated based on control request messages of the terminals from the AirNode, or may be generated by the SinkNode based on a decision of the SinkNode.

For example, the SinkNode receives a fifth message and a sixth message from the AirNode, where both the fifth message and the sixth message are control plane messages of the terminals. The SinkNode may determine the first message and the second message in response to the fifth message and the sixth message.

S302: The SinkNode establishes a target channel between the SinkNode and the AirNode. The target channel is a channel whose sliding window has a length of N, where N is greater than or equal to 2.

It should be understood that the step shown in S302 may alternatively be performed before S301. Alternatively, S302 may be replaced with the following step: The AirNode establishes a target channel between the AirNode and the SinkNode.

S303: The SinkNode sends the first message and the second message to the AirNode in a same sliding window through the target channel.

S304: The AirNode receives the first message and the second message through the target channel.

S305: If the SinkNode determines that the first message and the second message are received, the AirNode sends a positive response for the first message and a positive response for the second message to the SinkNode. The positive response for the first message is used to indicate that the first message is received, and the positive response for the second message is used to indicate that the second message is received.

The positive response for the first message and the positive response for the second message may be carried in a same message, or carried in different messages. The positive response for the first message and the first message may be carried on a same channel or different channels. The positive response for the second message and the second message may be carried on a same channel or different channels.

Correspondingly, the SinkNode receives the positive response for the first message and the positive response for the second message.

S306: The AirNode sends the first message to a first terminal, and sends the second message to a second terminal. The first terminal corresponds to the first message. For example, the first message carries an identifier of the first terminal. The second terminal corresponds to the second message. For example, the second message carries an identifier of the second terminal. For example, the first terminal may be the same as or different from the second terminal.

In another implementation of S102, the target channel may include a plurality of channels other than a control channel and a data channel (for example, including a first channel and a second channel, or including a first channel, a second channel, and more channels), where a quantity of concurrent messages of each channel is at least 1 (or a length of a sliding window of each channel is greater than or equal to 1).

For example, a port of the first channel is different from a data port and a control port of the first communication apparatus, and a port of the second channel is different from the data port and the control port of the first communication apparatus. For example, if a port occupied by the control channel is a port 5246 of the first communication apparatus, and a port occupied by the data channel is a port 5247 of the first communication apparatus, the first communication apparatus may use any port other than the port 5246 and the port 5247 as a port of the first channel, and use any port other than the port 5246 and the port 5247 as a port of the second channel. Similarly, the second communication apparatus may use a port other than the data port and the control port as a port of the first channel, and use another port other than the data port and the control port as a port of the second channel.

When the first message and the second message are transmitted through the first channel and the second channel, the first communication apparatus may transmit the first group of message packets corresponding to the first message to the second communication apparatus through the first channel, and determine the second group of message packets based on the second message. The first group of message packets may include one or more message packets, where each message packet may be used to carry content of the first message. The second group of message packets may include one or more message packets, where each message packet may be used to carry content of the second message.

Figure 8:
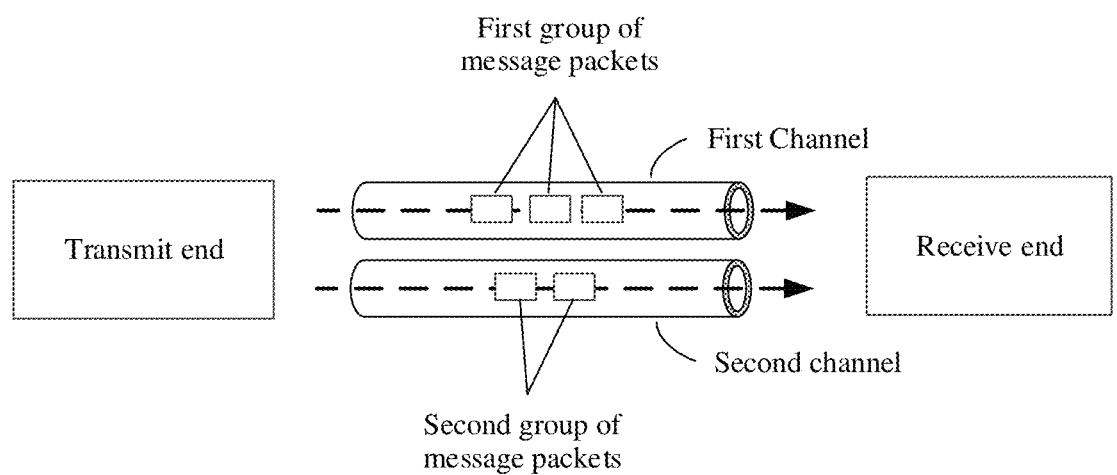
FIG. 8 is another schematic diagram of concurrently sending messages through a target channel according to an embodiment of this application.

As shown in FIG. 8, a sending process of a first message is used as an example. A first channel may be used to send a first group of message packets corresponding to the first message, where a same fragment ID may be allocated to the first group of message packets, and a sequence of the message packets is distinguished between by using a fragment offset, so that a second communication apparatus reassembles the first message based on the fragment ID and the fragment offset.

For example, fragment IDs, fragment offsets, and message sequence numbers that are allocated by a first communication apparatus to the first message and a second message in this example may be those shown in Table 1.

According to Table 1, after the second communication apparatus obtains the recombined first message, the second communication apparatus may send, to the first communication apparatus, a positive response that carries an SN #1, to indicate that the first message is received. When the second communication apparatus does not receive the first message (for example, a packet loss occurs), the second communication apparatus may send, to the first communication apparatus, a negative response that carries the SN #1, to indicate that the first message is not received (or in other words, the first message fails to be received). Subsequently, the first communication apparatus may retransmit the first group of message packets corresponding to the first message. The first communication apparatus transmits, through the first channel only after the first communication apparatus receives the positive response that carries the SN #1, a control plane message of a terminal, in a sending queue, sent after the first message.

In addition, a thread of the first channel is asynchronous with a thread of the second channel. Therefore, even if the first message needs to be retransmitted on the first channel, a process of retransmitting the first message does not affect sending of the second message on the second channel. For example, after receiving a second group of message packets corresponding to the second message, the second communication apparatus may deliver the reassembled second message to an upper layer of the second communication apparatus for subsequent processing, and does not need to process the second message after receiving the retransmitted first group of message packets.

For example, different resources may be respectively configured for a plurality of channels included in the target channel. Each resource may be one or more threads or one or more processes, so that threads of the plurality of channels are asynchronous. An example in which the target channel includes the first channel and the second channel is used. A first resource in a first resource pool may be used for the first channel, and a second resource in the first resource pool may be used for the second channel. The first resource pool may be a set of a plurality of threads (or processes), or the first resource pool may include one or more processes, and the first resource and the second resource are different threads or processes in the first resource pool. It should be understood that a resource in the first resource pool does not include threads or processes of the control channel and the data channel between the first communication apparatus and the second communication apparatus, or in other words, a channel corresponding to each resource in the first resource pool is not synchronized with the control channel or the data channel.

The first communication apparatus may further establish the first resource pool after receiving the first message and/or the second message; or the first communication apparatus may establish the first resource pool before receiving a message that is received earlier in the first message and the second message. Alternatively, the first resource pool may be established by the second communication apparatus. The first resource pool may be an input/output (input/output, I/O) thread pool, and a resource in the first resource pool may be an I/O thread.

In addition, the first communication apparatus and/or the second communication apparatus may further adjust a quantity of resources in the first resource pool based on a congestion status and a load status of the target channel. Each resource in the first resource pool may correspond to one target channel. For example, each thread in the first resource pool may be used to establish one target channel. Therefore, a larger quantity of resources in the first resource pool indicates a larger quantity of target channels that may be used to asynchronously transmit a control plane message of the terminal, in other words, a larger quantity of concurrent control plane messages of the terminals supported between the first communication apparatus and the second communication apparatus.

For example, when load of the first communication apparatus is higher than (or not lower than) a load threshold, the first communication apparatus may reduce the quantity of resources in the first resource pool. When load of the first communication apparatus is lower than (or not higher than) a load threshold, the first communication apparatus may increase the quantity of resources in the first resource pool. During implementation, the first communication apparatus may send a ninth message to the second communication apparatus, where the ninth message is used to configure the quantity of resources in the first resource pool. Alternatively, the second communication apparatus may send a tenth message to the first communication apparatus, where the tenth message is used to configure the quantity of resources in the first resource pool.

For example, the second communication apparatus may further buffer a response message (a positive response and/or a negative response) sent by the second communication apparatus to the first communication apparatus. A maximum quantity of response messages that can be buffered by the second communication apparatus is a quantity of threads in the first resource pool. When the first communication apparatus does not receive a response message of a control plane message, retransmission of the control plane message is triggered. Because the second communication apparatus buffers the response message, the second communication apparatus does not need to perform reprocessing, and directly sends the buffered response message to the first communication apparatus, so that a message processing delay can be reduced.

Figure 9:
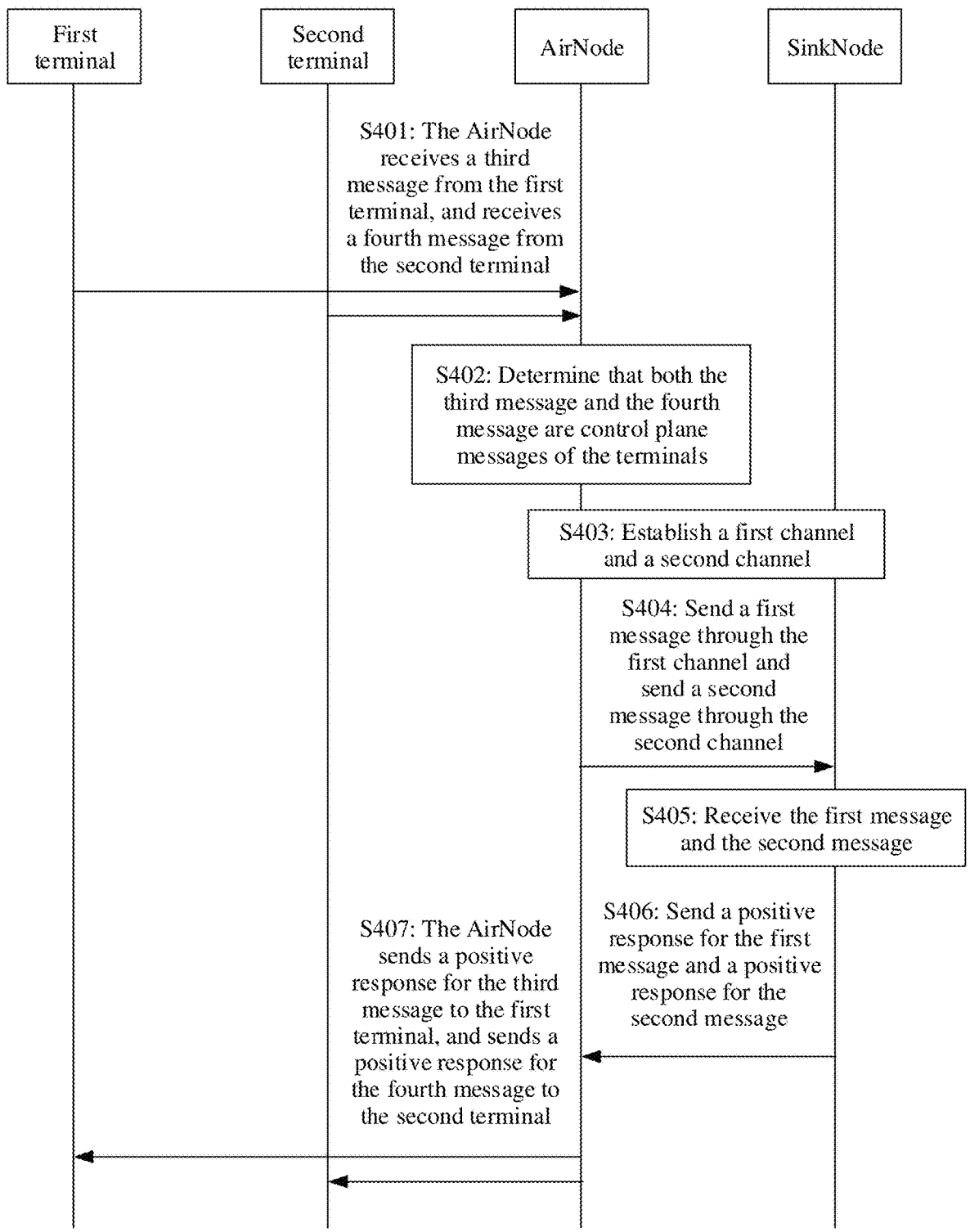
FIG. 9 is a schematic flowchart of another communication method according to an embodiment of this application.

If a first communication apparatus is an AirNode, a second communication apparatus is a SinkNode, and a third message and a fourth message are respectively sent by a first terminal and a second terminal, a communication method provided in an embodiment of this application may include the following steps shown in FIG. 9.

S401: The AirNode receives the third message from the first terminal, and receives the fourth message from the second terminal.

S402: The AirNode determines that both the third message and the fourth message are request messages.

S403: The AirNode establishes a first channel and a second channel between the AirNode and the SinkNode.

It should be understood that the step shown in S403 may alternatively be performed before S402 or S401.

S404: The AirNode sends a first message to the SinkNode through the first channel, and sends a second message to the SinkNode through the second channel. The first message is determined based on the third message, and the second message is determined based on the fourth message.

S405: The SinkNode receives the first message and the second message.

S406: If the SinkNode determines that the first message and the second message are received, the SinkNode sends a positive response for the first message and a positive response for the second message to the AirNode. The positive response for the first message is used to indicate that the first message is received, and the positive response for the second message is used to indicate that the second message is received.

The positive response for the first message and the positive response for the second message may be carried in a same message, or carried in different messages. The positive response for the first message and the first message may be carried on a same channel or different channels. The positive response for the second message and the second message may be carried on a same channel or different channels.

Correspondingly, the AirNode receives the positive response for the first message and the positive response for the second message.

S407: The AirNode sends a positive response for the third message to the first terminal, and sends a positive response for the fourth message to the second terminal. The positive response for the third message may be used to indicate that the AirNode has forwarded the third message to the SinkNode (and/or used to indicate that the AirNode receives the first message). The positive response for the fourth message may be used to indicate that the AirNode has forwarded the fourth message to the SinkNode (and/or used to indicate that the AirNode receives the second message).

Figure 10:
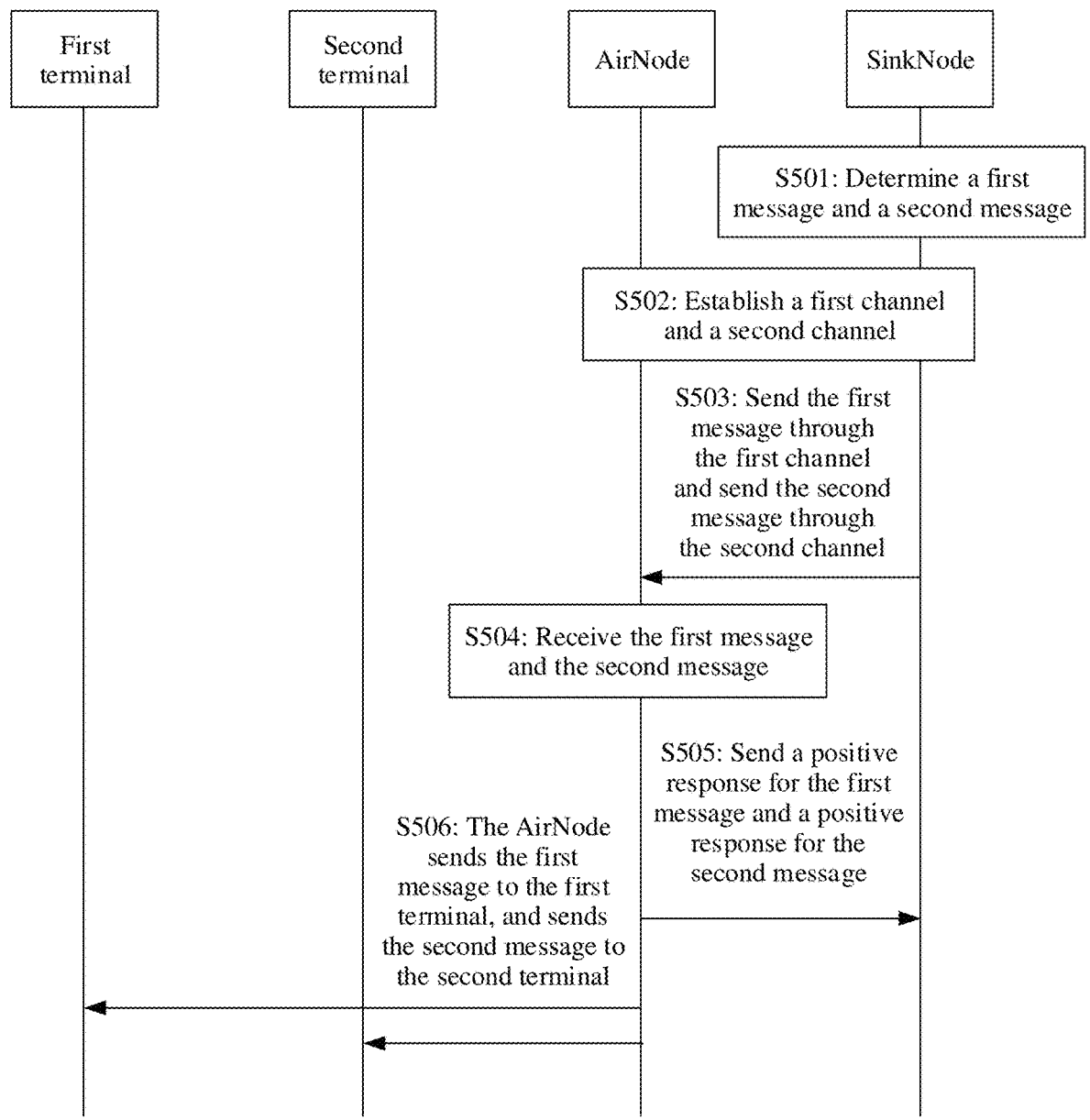
FIG. 10 is a schematic flowchart of another communication method according to an embodiment of this application.

If a first communication apparatus is a SinkNode and the second communication apparatus is an AirNode, another communication method provided in an embodiment of this application may include the following steps shown in FIG. 10.

S501: The SinkNode determines a first message and a second message.

Both the first message and the second message are control plane messages of terminals. The first message and the second message may be generated based on control request messages of the terminals from the AirNode, or may be generated by the SinkNode based on a decision of the SinkNode.

For example, the SinkNode receives a fifth message and a sixth message from the AirNode, where both the fifth message and the sixth message are control plane messages of the terminals. The SinkNode may determine the first message and the second message in response to the fifth message and the sixth message.

S502: The SinkNode establishes a first channel and a second channel between the SinkNode and the AirNode.

It should be understood that the step shown in S502 may alternatively be performed before S501. Alternatively, S502 may be replaced with the following step: The AirNode establishes a first channel and a second channel between the AirNode and the SinkNode.

S503: The SinkNode sends the first message to the AirNode through the first channel, and sends the second message to the AirNode through the second channel.

S504: The AirNode receives the first message and the second message.

S505: If the SinkNode determines that the first message and the second message are received, the AirNode sends a positive response for the first message and a positive response for the second message to the SinkNode. The positive response for the first message is used to indicate that the first message is received, and the positive response for the second message is used to indicate that the second message is received.

The positive response for the first message and the positive response for the second message may be carried in a same message, or carried in different messages. The positive response for the first message and the first message may be carried on a same channel or different channels. The positive response for the second message and the second message may be carried on a same channel or different channels.

Correspondingly, the SinkNode receives the positive response for the first message and the positive response for the second message.

S506: The AirNode sends the first message to a first terminal, and sends the second message to a second terminal. The first terminal corresponds to the first message. For example, the first message carries an identifier of the first terminal. The second terminal corresponds to the second message. For example, the second message carries an identifier of the second terminal. For example, the first terminal may be the same as or different from the second terminal.

Based on a same inventive concept as the foregoing method embodiments, an embodiment of this application further provides a communication apparatus. The communication apparatus may have functions of the first communication apparatus and/or the second communication apparatus in the foregoing method embodiments, and may be configured to perform the steps performed by the first communication apparatus and/or the second communication apparatus in the foregoing method embodiments. The functions may be implemented by hardware, or may be implemented by software or hardware executing corresponding software. The hardware or the software includes one or more modules corresponding to the functions.

Figure 11:
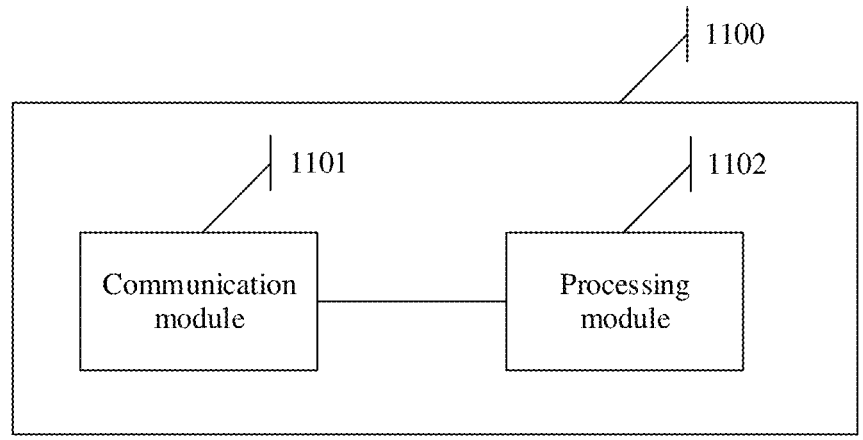
FIG. 11 is a schematic diagram of a structure of a communication apparatus according to an embodiment of this application.

In a possible implementation, a communication apparatus 1100 shown in FIG. 11 may be used as the first communication apparatus in the foregoing method embodiments, and performs the steps performed by the first communication apparatus in the foregoing method embodiments. As shown in FIG. 11, the communication apparatus 1100 may include a communication module 1101 and a processing module 1102. The communication module 1101 and the processing module 1102 are coupled to each other. The communication module 1101 may be configured to support the communication apparatus 1100 in performing communication, for example, performing a sending action and/or a receiving action performed by the first communication apparatus or the AirNode in S102, S201, S204, S206, S207, S304, S305, S306, S401, S404, S406, S407, S504, S505, or S506 in FIG. 4, FIG. 6, FIG. 7, FIG. 9, and FIG. 10. The processing module 1102 may be configured to support the communication apparatus 1100 in performing a processing action in the foregoing method embodiments, for example, performing a processing action performed by the first communication apparatus or the AirNode in S101, S202, S203, S302, S402, S403, or S502 in FIG. 4, FIG. 6, FIG. 7, and FIG. 9.

Specifically, when the communication methods provided in embodiments of this application are performed, the processing module 1102 may be configured to obtain a first message and a second message, where both the first message and the second message are control plane messages of terminals. The communication module 1101 may be configured to send the first message and the second message to a second communication apparatus through a target channel, where the target channel is used to transmit a control plane message of a terminal. The target channel includes a channel whose sliding window has a length of N, where N is greater than or equal to 2, and a third message and a fourth message are transmitted in a same sliding window of the target channel. Alternatively, the target channel includes a first channel and a second channel, the first channel is used to carry a third message, the second channel is used to carry a fourth message, and a thread of the first channel is asynchronous with a thread of the second channel.

In addition, the communication module 1101 may be further configured to send a first indication and a second indication to the second communication apparatus, where the first indication is used to determine that the first message is the control plane message of the terminal, and the second indication is used to determine that the second message is the control plane message of the terminal.

In a possible example, the communication apparatus is an access point, and the communication module 1101 may be further configured to receive the third message and the fourth message from the terminals. The processing module 1102 may be further configured to determine that both the third message and the fourth message are control plane messages of the terminals, where the first message is determined based on the third message, and the second message is determined based on the fourth message. Specifically, the processing module 1102 may determine that both the third message and the fourth message are RRC messages.

In another specific example, if a message termination of the third message is the first communication apparatus, the processing module 1102 is specifically configured to: parse the third message to determine message content of the third message, and determine the first message based on the message content of the third message. Alternatively, if a message termination of the third message is the second communication apparatus, the processing module 1102 may encapsulate the third message to obtain the first message.

Similarly, if a message termination of the fourth message is the first communication apparatus, the processing module 1102 may parse the fourth message to determine message content of the fourth message, and determine the second message based on the message content of the fourth message. Alternatively, if a message termination of the fourth message is the second communication apparatus, the processing module 1102 may encapsulate the fourth message to obtain the second message.

For example, if the first communication apparatus is an access controller, the communication module 1101 may be further configured to receive a fifth message and a sixth message from the second communication apparatus through a channel whose sliding window has a length of M, where M is greater than or equal to 2, and the fifth message and the sixth message are control plane messages of the terminals. Alternatively, the communication module 1101 may be further configured to: receive a fifth message from the second communication apparatus through a third channel, and receive a sixth message from the second communication apparatus through a fourth channel, where a thread of the third channel is asynchronous with a thread of the fourth channel, and the fifth message and the sixth message are control plane messages of the terminals. The processing module 1102 may be configured to: determine the first message in response to the fifth message; and determine the second message in response to the sixth message.

In this example, the communication module 1101 may be further configured to receive a third indication and a fourth indication from the second communication apparatus. The third indication is used to determine that the fifth message is the control plane message of the terminal, and the fourth indication is used to determine that the sixth message is the control plane message of the terminal.

In addition, if the target channel includes the channel whose sliding window length is N, the communication module 1101 may further send a seventh message to the second communication apparatus through the target channel or a control channel, where the seventh message is used to configure a value of N. Alternatively, the communication module 1101 may further receive an eighth message from the second communication apparatus through the target channel or a control channel, where the eighth message is used to configure a value of N.

If the target channel includes the first channel and the second channel, and the first channel and the second channel each correspond to a resource in a first resource pool, the communication module 1101 may be further configured to send a ninth message to the second communication apparatus through the target channel or a control channel between the first communication apparatus and the second communication apparatus, where the ninth message is used to configure a quantity of resources in the first resource pool. Alternatively, the communication module 1101 may be further configured to receive a tenth message from the second communication apparatus through the target channel or a control channel between the first communication apparatus and the second communication apparatus, where the tenth message is used to configure a quantity of resources in the first resource pool.

Figure 12:
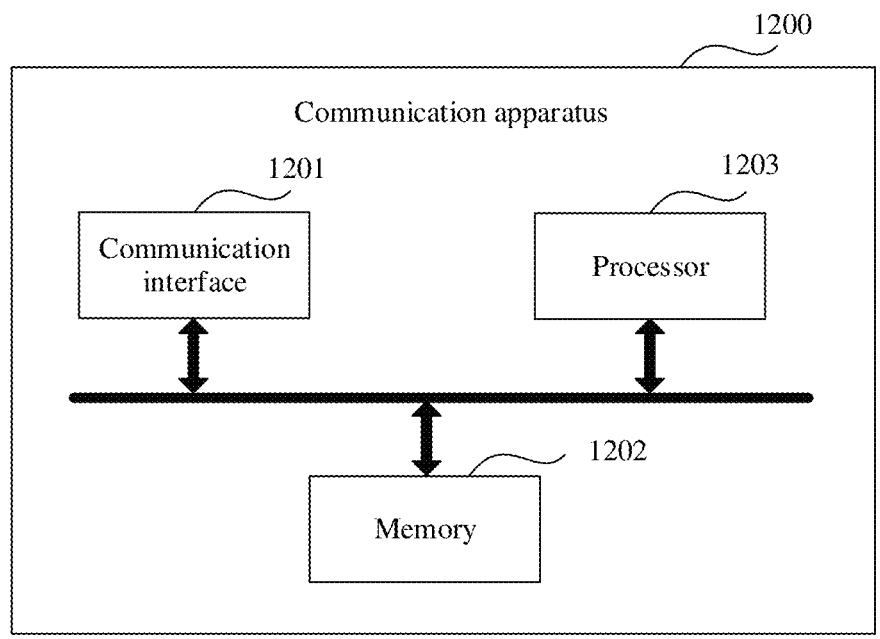
FIG. 12 is a schematic diagram of a structure of another communication apparatus according to an embodiment of this application.

In addition, in another possible implementation, if the communication apparatus is the first communication apparatus, a structure of the communication apparatus may alternatively be that shown in FIG. 12. For ease of understanding, FIG. 12 shows only a structure necessary for performing the methods shown in this application, and no limitation is imposed on that the communication apparatus may have more components in this application. The communication apparatus 1200 may include a communication interface 1201, a memory 1202, and a processor 1203. The communication interface 1201 may be used by the communication apparatus to perform communication, for example, to send or receive a signal. The memory 1202 is coupled to the processor 1203, and is configured to store a program and data that are necessary for implementing functions of the communication apparatus 1200. The processor 1203 is configured to support the communication apparatus 1200 in performing a processing function performed by the first communication apparatus in the foregoing methods, for example, determining to generate information and a message that are sent by the communication interface 1201, and/or demodulating and decoding a signal received by the communication interface 1201. The memory 1202 and the processor 1203 may be integrated or may be independent of each other.

For example, the communication interface 1201 may be a wireless communication interface (also referred to as a wireless transceiver), and may be configured to support the communication apparatus 1200 in receiving and sending signaling and/or data through a wireless air interface. In addition, the communication interface may alternatively be a communication port, for example, a communication port (also referred to as an interface) used for communication between network elements. The communication interface 1201 may also be referred to as a transceiver unit or a communication unit. The processor 1203 may be implemented by using a processing chip or a processing circuit.

When the communication methods shown in this application are performed, the communication interface 1201 may be configured to perform the steps performed by the communication module 1101, and the processor 1203 may invoke a program in the memory 1202 to perform the steps performed by the processing module 1102.

Specifically, the processor 1203 may be configured to obtain a first message and a second message, where both the first message and the second message are control plane messages of terminals. The communication interface 1201 may be configured to send the first message and the second message to a second communication apparatus through a target channel, where the target channel is used to transmit a control plane message of a terminal. The target channel includes a channel whose sliding window has a length of N, where N is greater than or equal to 2, and a third message and a fourth message are transmitted in a same sliding window of the target channel. Alternatively, the target channel includes a first channel and a second channel, the first channel is used to carry a third message, the second channel is used to carry a fourth message, and a thread of the first channel is asynchronous with a thread of the second channel.

In addition, the communication interface 1201 may be further configured to send a first indication and a second indication to the second communication apparatus, where the first indication is used to determine that the first message is the control plane message of the terminal, and the second indication is used to determine that the second message is the control plane message of the terminal.

In a possible example, the communication apparatus is an access point, and the communication interface 1201 may be further configured to receive the third message and the fourth message from the terminals. The processor 1203 may be further configured to determine that both the third message and the fourth message are control plane messages of the terminals, where the first message is determined based on the third message, and the second message is determined based on the fourth message. Specifically, the processor 1203 may determine that both the third message and the fourth message are RRC messages.

In another specific example, if a message termination of the third message is the first communication apparatus, the processor 1203 is specifically configured to: parse the third message to determine message content of the third message, and determine the first message based on the message content of the third message. Alternatively, if a message termination of the third message is the second communication apparatus, the processor 1203 may encapsulate the third message to obtain the first message.

Similarly, if a message termination of the fourth message is the first communication apparatus, the processor 1203 may parse the fourth message to determine message content of the fourth message, and determine the second message based on the message content of the fourth message. Alternatively, if a message termination of the fourth message is the second communication apparatus, the processor 1203 may encapsulate the fourth message to obtain the second message.

For example, if the first communication apparatus is an access controller, the communication interface 1201 may be further configured to receive a fifth message and a sixth message from the second communication apparatus through a channel whose sliding window has a length of M, where M is greater than or equal to 2, and the fifth message and the sixth message are control plane messages of the terminals. Alternatively, the communication interface 1201 may be further configured to: receive a fifth message from the second communication apparatus through a third channel, and receive a sixth message from the second communication apparatus through a fourth channel, where a thread of the third channel is asynchronous with a thread of the fourth channel, and the fifth message and the sixth message are control plane messages of the terminals. The processor 1203 may be configured to: determine the first message in response to the fifth message; and determine the second message in response to the sixth message.

In this example, the communication interface 1201 may be further configured to receive a third indication and a fourth indication from the second communication apparatus. The third indication is used to determine that the fifth message is the control plane message of the terminal, and the fourth indication is used to determine that the sixth message is the control plane message of the terminal.

In addition, if the target channel includes the channel whose sliding window length is N, the communication interface 1201 may further send a seventh message to the second communication apparatus through the target channel or a control channel, where the seventh message is used to configure a value of N. Alternatively, the communication interface 1201 may further receive an eighth message from the second communication apparatus through the target channel or a control channel, where the eighth message is used to configure a value of N.

If the target channel includes the first channel and the second channel, and the first channel and the second channel each correspond to a resource in a first resource pool, the communication interface 1201 may be further configured to send a ninth message to the second communication apparatus through the target channel or a control channel between the first communication apparatus and the second communication apparatus, where the ninth message is used to configure a quantity of resources in the first resource pool. Alternatively, the communication interface 1201 may be further configured to receive a tenth message from the second communication apparatus through the target channel or a control channel between the first communication apparatus and the second communication apparatus, where the tenth message is used to configure a quantity of resources in the first resource pool.

Figure 13:
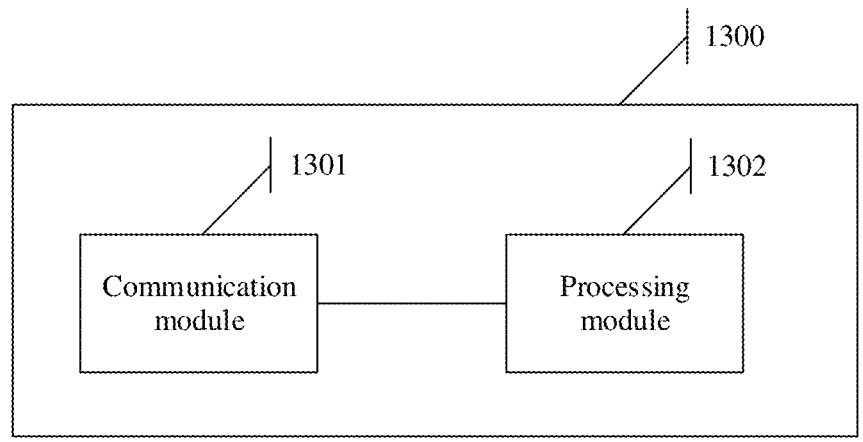
FIG. 13 is a schematic diagram of a structure of another communication apparatus according to an embodiment of this application.

In a possible implementation, a communication apparatus 1300 shown in FIG. 13 may be used as the second communication apparatus in the foregoing method embodiments, and performs the steps performed by the second communication apparatus in the foregoing method embodiments. As shown in FIG. 13, the communication apparatus 1300 may include a communication module 1301 and a processing module 1302. The communication module 1301 and the processing module 1302 are coupled to each other. The communication module 1301 may be configured to support the communication apparatus 1300 in performing communication, for example, performing a sending action and/or a receiving action performed by the second communication apparatus or the SinkNode in S103, S205, S206, S303, S305, S405, S406, S503, or S505 in FIG. 4, FIG. 6, FIG. 7, FIG. 9, and FIG. 10. The processing module 1302 may be configured to support the communication apparatus 1300 in performing a processing action in the foregoing method embodiments, for example, performing a processing action performed by the second communication apparatus or the SinkNode in S103, S203, S301, S302, S403, S501, or S502 in FIG. 4, FIG. 6, FIG. 7, FIG. 9, and FIG. 10.

When the communication methods provided in embodiments of this application are performed, the communication module 1301 may be configured to receive a first message and a second message from a first communication apparatus through a target channel, where both the first message and the second message are control plane messages of terminals. The target channel includes a channel whose sliding window has a length of N, where N is greater than or equal to 2, and a third message and a fourth message are transmitted in a same sliding window of the target channel. Alternatively, the target channel includes a first channel and a second channel, the first channel is used to carry a third message, the second channel is used to carry a fourth message, and a thread of the first channel is asynchronous with a thread of the second channel.

In addition, the communication module 1301 may further receive a first indication and a second indication from the first communication apparatus, where the first indication is used to determine that the first message is the control plane message of the terminal, and the second indication is used to determine that the second message is the control plane message of the terminal. Therefore, the processing module 1302 may determine that the first message and the second message are the control plane messages of the terminals.

In a possible example, the second communication apparatus is an access point, and the communication module 1301 is further configured to send a fifth message and a sixth message to the first communication apparatus through a channel whose sliding window has a length of M, where M is greater than or equal to 2, and the fifth message and the sixth message are control plane messages of the terminals; or send a fifth message to the first communication apparatus through a third channel, and send a sixth message to the first communication apparatus through a fourth channel, where a thread of the third channel is asynchronous with a thread of the fourth channel, and the fifth message and the sixth message are control plane messages of the terminals.

In this example, the communication module 1301 may be further configured to send a third indication and a fourth indication to the first communication apparatus, where the third indication is used to determine that the fifth message is the control plane message of the terminal, and the fourth indication is used to determine that the sixth message is the control plane message of the terminal.

In another possible example, the second communication apparatus is an access point, and the communication module 1301 may be further configured to: send the first message to the terminal corresponding to the first message; and send the second message to the terminal corresponding to the second message.

For example, if the target channel includes the channel whose sliding window has the length of N, the communication module 1301 may be further configured to receive a seventh message from the first communication apparatus through the target channel or a control channel between the first communication apparatus and the second communication apparatus, where the seventh message is used to configure a value of N. Alternatively, the communication module 1301 may be further configured to send an eighth message to the first communication apparatus through the target channel or a control channel between the first communication apparatus and the second communication apparatus, where the eighth message is used to configure a value of N.

For example, if the target channel includes the first channel and the second channel, and the first channel and the second channel each correspond to a resource in a first resource pool, the communication module 1301 may be further configured to receive a ninth message from the first communication apparatus through the target channel or a control channel, where the ninth message is used to configure a quantity of resources in the first resource pool. Alternatively, the communication module 1301 may be further configured to send a tenth message to the first communication apparatus through the target channel or a control channel, where the tenth message is used to configure a quantity of resources in the first resource pool.

Figure 14:
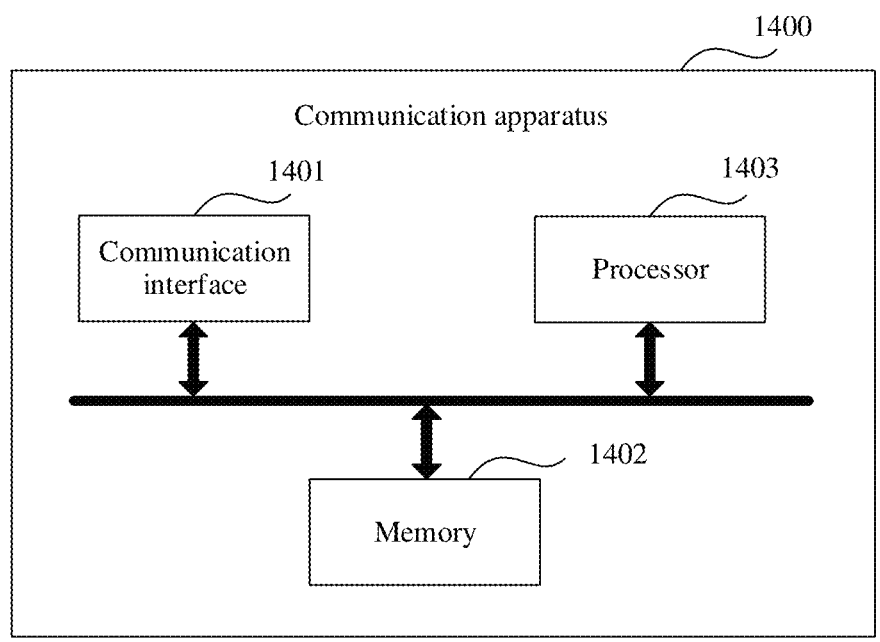
FIG. 14 is a schematic diagram of a structure of another communication apparatus according to an embodiment of this application.

In addition, in another possible implementation, if the communication apparatus is the second communication apparatus, a structure of the communication apparatus may alternatively be that shown in FIG. 14. For ease of understanding, FIG. 14 shows only a structure necessary for performing the methods shown in this application, and no limitation is imposed on that the communication apparatus may have more components in this application. The communication apparatus 1400 may include a communication interface 1401, a memory 1402, and a processor 1403. The communication interface 1401 may be used by the communication apparatus to perform communication, for example, to send or receive a signal. The memory 1402 is coupled to the processor 1403, and is configured to store a program and data that are necessary for implementing functions of the communication apparatus 1400. The processor 1403 is configured to support the communication apparatus 1400 in performing a processing function performed by the second communication apparatus in the foregoing methods, for example, determining to generate information and a message that are sent by the communication interface 1401, and/or demodulating and decoding a signal received by the communication interface 1401. The memory 1402 and the processor 1403 may be integrated or may be independent of each other.

For example, the communication interface 1401 may be a wireless transceiver, and may be configured to support the communication apparatus 1400 in receiving and sending signaling and/or data through a wireless air interface. The communication interface 1401 may also be referred to as a transceiver unit or a communication unit. In addition, the communication interface may alternatively be a communication port, for example, a communication port used for communication between network elements. The processor 1403 may be implemented by using a processing chip or a processing circuit.

When the communication methods shown in this application are performed, the communication interface 1401 may be configured to perform the steps performed by the communication module 1301, and the processor 1403 may invoke a program in the memory 1402 to perform the steps performed by the processing module 1302.

Specifically, the communication interface 1401 may be configured to receive a first message and a second message from a first communication apparatus through a target channel, where both the first message and the second message are control plane messages of terminals. The target channel includes a channel whose sliding window has a length of N, where N is greater than or equal to 2, and a third message and a fourth message are transmitted in a same sliding window of the target channel. Alternatively, the target channel includes a first channel and a second channel, the first channel is used to carry a third message, the second channel is used to carry a fourth message, and a thread of the first channel is asynchronous with a thread of the second channel.

In addition, the communication interface 1401 may further receive a first indication and a second indication from the first communication apparatus, where the first indication is used to determine that the first message is the control plane message of the terminal, and the second indication is used to determine that the second message is the control plane message of the terminal. Therefore, the processor 1403 may determine that the first message and the second message are the control plane messages of the terminals.

In a possible example, the second communication apparatus is an access point, and the communication interface 1401 is further configured to send a fifth message and a sixth message to the first communication apparatus through a channel whose sliding window has a length of M, where M is greater than or equal to 2, and the fifth message and the sixth message are control plane messages of the terminals; or send a fifth message to the first communication apparatus through a third channel, and send a sixth message to the first communication apparatus through a fourth channel, where a thread of the third channel is asynchronous with a thread of the fourth channel, and the fifth message and the sixth message are control plane messages of the terminals.

In this example, the communication interface 1401 may be further configured to send a third indication and a fourth indication to the first communication apparatus, where the third indication is used to determine that the fifth message is the control plane message of the terminal, and the fourth indication is used to determine that the sixth message is the control plane message of the terminal.

In another possible example, the second communication apparatus is an access point, and the communication interface 1401 may be further configured to: send the first message to the terminal corresponding to the first message; and send the second message to the terminal corresponding to the second message.

For example, if the target channel includes the channel whose sliding window has the length of N, the communication interface 1401 may be further configured to receive a seventh message from the first communication apparatus through the target channel or a control channel between the first communication apparatus and the second communication apparatus, where the seventh message is used to configure a value of N. Alternatively, the communication interface 1401 may be further configured to send an eighth message to the first communication apparatus through the target channel or a control channel between the first communication apparatus and the second communication apparatus, where the eighth message is used to configure a value of N.

For example, if the target channel includes the first channel and the second channel, and the first channel and the second channel each correspond to a resource in a first resource pool, the communication interface 1401 may be further configured to receive a ninth message from the first communication apparatus through the target channel or a control channel, where the ninth message is used to configure a quantity of resources in the first resource pool. Alternatively, the communication interface 1401 may be further configured to send a tenth message to the first communication apparatus through the target channel or a control channel, where the tenth message is used to configure a quantity of resources in the first resource pool.

Based on a same concept as the foregoing method embodiments, an embodiment of this application further provides a computer-readable storage medium. The computer-readable storage medium stores a computer program (also referred to as instructions). When the program is executed by a computer, the computer is enabled to perform the operations performed by the first communication apparatus and/or the second communication apparatus in any one of the foregoing method embodiments or the possible implementations of the foregoing method embodiments.

Based on a same concept as the foregoing method embodiments, this application further provides a computer program product. When the computer program product is invoked and executed by a computer, the computer is enabled to implement the operations performed by the first communication apparatus and/or the second communication apparatus in any one of the foregoing method embodiments or the possible implementations of the foregoing method embodiments.

Based on a same concept as the foregoing method embodiments, this application further provides a chip or a chip system. The chip is coupled to a transceiver, and is configured to implement the operations performed by the first communication apparatus and/or the second communication apparatus in any one of the foregoing method embodiments or the possible implementations of the foregoing method embodiments. The chip system may include the chip and components such as a memory and a communication interface.

Based on a same concept as the foregoing method embodiments, this application further provides a communication system. The communication system may be configured to implement the operations performed by the first communication apparatus and/or the second communication apparatus in any one of the foregoing method embodiments or the possible implementations of the foregoing method embodiments. For example, the communication system has a structure shown in FIG. 1 and/or FIG. 3.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. In this way, this application is intended to cover these modifications and variations of this application provided that they fall within the scope of the claims of this application and equivalent technologies thereof.

What is claimed is:

1. A communication method, comprising:
    obtaining, by a first communication apparatus, a first message and a second message, wherein both the first message and the second message are control plane messages of terminals; and
    sending, by the first communication apparatus, the first message and the second message to a second communication apparatus through a target channel, wherein the target channel is used to transmit a control plane message of a terminal, wherein
    the target channel comprises a channel whose sliding window has a length of N, wherein N is greater than or equal to 2,
    the first message and the second message are transmitted in a same sliding window of the target channel, and
    one of the first communication apparatus and the second communication apparatus is a wireless access point accessed by the terminals.

2. The method according to claim 1, wherein the method further comprises:
    sending, by the first communication apparatus, a first indication and a second indication to the second communication apparatus, wherein
    the first indication is used to determine that the first message is a control plane message of a terminal among the terminals, and
    the second indication is used to determine that the second message is a control plane message of a terminal among the terminals.

3. The method according to claim 1, wherein the first communication apparatus is an access point, and the method further comprises:
    receiving, by the first communication apparatus, a third message and a fourth message from the terminals; and
    determining, by the first communication apparatus, that both the third message and the fourth message are control plane messages of the terminals, wherein the first message is determined based on the third message, and the second message is determined based on the fourth message.

4. The method according to claim 3, wherein the determining, by the first communication apparatus, that both the third message and the fourth message are control plane messages of the terminals comprises:
    determining, by the first communication apparatus, that both the third message and the fourth message are radio resource control (RRC) messages.

5. The method according to claim 3, wherein
    in response to a message termination of the third message being the first communication apparatus, the obtaining the first message comprises:
        parsing, by the first communication apparatus, the third message to determine message content of the third message; and
        determining, by the first communication apparatus, the first message based on the message content of the third message; and
    in response to a message termination of the third message being the second communication apparatus, the obtaining the first message comprises:
        encapsulating, by the first communication apparatus, the third message to obtain the first message.

6. The method according to claim 3, wherein
    in response to a message termination of the fourth message being the first communication apparatus, the obtaining the second message comprises:
        parsing, by the first communication apparatus, the fourth message to determine message content of the fourth message; and
        determining, by the first communication apparatus, the second message based on the message content of the fourth message; and
    in response to a message termination of the fourth message being the second communication apparatus, the obtaining the second message comprises:
        encapsulating, by the first communication apparatus, the fourth message to obtain the second message.

7. The method according to claim 1, wherein the first communication apparatus is an access controller, and the method further comprises:
    receiving, by the first communication apparatus, a fifth message and a sixth message from the second communication apparatus through a channel whose sliding window has a length of M, wherein M is greater than or equal to 2, and the fifth message and the sixth message are control plane messages of the terminals.

8. The method according to claim 7, wherein the method further comprises:

receiving, by the first communication apparatus, a third
indication and a fourth indication from the second
communication apparatus, wherein
the third indication is used to determine that the fifth
message is a control plane message of a terminal
among the terminals, and
the fourth indication is used to determine that the sixth
message is a control plane message of a terminal
among the terminals.

9. The method according to claim 1, wherein the method further comprises:
sending, by the first communication apparatus, a seventh message to the second communication apparatus through the target channel or a control channel, wherein the seventh message is used to configure a value of N.

10. The method according to claim 1, wherein the method further comprises:
receiving, by the first communication apparatus, an eighth message from the second communication apparatus through the target channel or a control channel, wherein the eighth message is used to configure a value of N.

11. The method according to claim 1, wherein
the first communication apparatus is the wireless access point accessed by the terminals, and
the second communication apparatus is an access controller communicated with the first communication apparatus in accordance with a control and provisioning of wireless access points (CAPWAP) protocol.

12. The method according to claim 1, wherein
the second communication apparatus is the wireless access point accessed by the terminals, and
the first communication apparatus is an access controller communicated with the second communication apparatus in accordance with a control and provisioning of wireless access points (CAPWAP) protocol.

13. The method according to claim 1, wherein
the first message and the second message sent through the target channel are encapsulated in control and provisioning of wireless access points (CAPWAP) packets.

14. A communication method, comprising:
obtaining, by a first communication apparatus, a first message and a second message, wherein both the first message and the second message are control plane messages of terminals; and
sending, by the first communication apparatus, the first message and the second message to a second communication apparatus through a target channel, wherein the target channel is used to transmit a control plane message of a terminal, wherein
the target channel comprises a first channel and a second channel, the first channel is used to carry the first message, the second channel is used to carry the second message, and a thread of the first channel is asynchronous with a thread of the second channel,
the first channel and the second channel each correspond to a resource in a first resource pool, and
the method further comprises:
sending, by the first communication apparatus, a ninth message to the second communication apparatus through the target channel or a control channel between the first communication apparatus and the second communication apparatus, wherein the ninth message is used to configure a quantity of resources in the first resource pool; or
receiving, by the first communication apparatus, a tenth message from the second communication apparatus through the target channel or a control channel between the first communication apparatus and the second communication apparatus, wherein the tenth message is used to configure a quantity of resources in the first resource pool.

15. The method according to claim 14, wherein
the first communication apparatus is an access controller,
the method further comprises:
receiving, by the first communication apparatus, a fifth message from the second communication apparatus through a third channel, and receiving a sixth message from the second communication apparatus through a fourth channel, wherein a thread of the third channel is asynchronous with a thread of the fourth channel, and the fifth message and the sixth message are control plane messages of the terminals, and
the obtaining, by the first communication apparatus, the first message and the second message comprises:
determining, by the first communication apparatus, the first message in response to the fifth message; and
determining, by the first communication apparatus, the second message in response to the sixth message.

16. A communication apparatus, comprising a processor and a communication interface, wherein
the processor is connected to the communication interface,
the processor is configured to obtain a first message and a second message, wherein both the first message and the second message are control plane messages of terminals,
the communication interface is configured to send the first message and the second message to a second communication apparatus through a target channel, wherein the target channel is used to transmit a control plane message of a terminal,
the target channel comprises a channel whose sliding window has a length of N, wherein N is greater than or equal to 2,
the communication interface is configured to transmit the first message and the second message in a same sliding window of the target channel,
the communication apparatus is an access point,
the communication interface is further configured to receive a third message and a fourth message from the terminals, and
the processor is further configured to
determine that both the third message and the fourth message are control plane messages of the terminals,
determine the first message based on the third message, and
determine the second message based on the fourth message.

17. The communication apparatus according to claim 16, wherein the communication interface is further configured to:
send a first indication and a second indication to the second communication apparatus, wherein
the first indication is used to determine that the first message is a control plane message of a terminal among the terminals, and
the second indication is used to determine that the second message is a control plane message of a terminal among the terminals.

18. The communication apparatus according to claim 16, wherein the processor is configured to:
determine that both the third message and the fourth message are radio resource control (RRC) messages.

19. The communication apparatus according to claim 16, wherein
  in response to a message termination of the third message being the communication apparatus, the processor is configured to:
    parse the third message to determine message content of the third message, and
    determine the first message based on the message content of the third message.

20. The communication apparatus according to claim 16, wherein
  in response to a message termination of the fourth message being the communication apparatus, the processor is configured to:
    parse the fourth message to determine message content of the fourth message, and
    determine the second message based on the message content of the fourth message.

\* \* \* \* \*